(12) United States Patent
Mailey et al.

(10) Patent No.: US 9,567,021 B2
(45) Date of Patent: Feb. 14, 2017

(54) DYNAMICALLY STABLE STAIR CLIMBING HOME ROBOT

(71) Applicants: Christopher Mailey, Huntsville, AL (US); Stephen John Hsu, Gilbert, AZ (US)

(72) Inventors: Christopher Mailey, Huntsville, AL (US); Stephen John Hsu, Gilbert, AZ (US)

(*) Notice: Subject to any disclaimer, the term of this patent is extended or adjusted under 35 U.S.C. 154(b) by 0 days.

(21) Appl. No.: 14/736,668

(22) Filed: Jun. 11, 2015

(65) Prior Publication Data

US 2016/0362147 A1    Dec. 15, 2016

(51) Int. Cl.
*B62D 55/075*    (2006.01)
*A61G 5/06*    (2006.01)

(52) U.S. Cl.
CPC .............. *B62D 55/075* (2013.01); *A61G 5/061* (2013.01); *A61G 5/066* (2013.01)

(58) Field of Classification Search
CPC ........ B62D 55/075; A61G 5/061; A61G 5/066
See application file for complete search history.

(56) References Cited

U.S. PATENT DOCUMENTS

| | | | |
|---|---|---|---|
| 3,166,138 A | 1/1965 | Dunn, Jr. | |
| 4,709,773 A * | 12/1987 | Clement | B62D 55/065 180/9.32 |
| 5,022,812 A * | 6/1991 | Coughlan | B25J 5/005 180/9.32 |
| 7,348,747 B1 * | 3/2008 | Theobold | B25J 5/005 318/568.11 |
| 8,327,960 B2 * | 12/2012 | Couture | B25J 5/005 180/9.1 |
| 8,413,752 B2 * | 4/2013 | Page | B25J 5/005 180/68.5 |
| 2004/0216932 A1 | 11/2004 | Giovanetti et al. | |

FOREIGN PATENT DOCUMENTS

| | | |
|---|---|---|
| EP | 0 197 020 A1 | 10/1986 |
| WO | 2004/039612 A2 | 5/2004 |
| WO | 2008/128950 A2 | 10/2008 |

OTHER PUBLICATIONS

Transmittal; International Search Report; and Written Opinion of the International Searching Authority for International Application No. PCT/US2016/036363.

* cited by examiner

*Primary Examiner* — Joseph Rocca
*Assistant Examiner* — Marlon A Arce
(74) *Attorney, Agent, or Firm* — Katten Muchin Rosenman LLP

(57) ABSTRACT

The present disclosure is directed to robotics, and more particularly to mobile robots capable of climbing stairs in a dynamically stable manner and operate in home environments with one or more of the following features or combinations thereof disclosed herein or in the Detailed Description below.

5 Claims, 26 Drawing Sheets

DYNAMICALLY STABLE STAIR CLIMBING HOME ROBOT

TECHNICAL FIELD

The present invention relates to robotic systems, methods and apparatuses, and more particularly to mobile robots capable of climbing stairs in a dynamically stable manner and operate in home environments.

BACKGROUND

Home robots represent one of the great unfulfilled technology applications for improving society. Such home robots, as will be discussed below, may be created to perform a variety of tasks within the home including, but not limited to, cleaning and other chores, interacting with humans, and home monitoring.

Vital to robot operations in the home is the ability to safely maneuver around the house without having to alter the home. Most difficult and complicated is maneuvering up and down stairs without damaging the stairs or surrounding area while maintaining stability throughout the descending or ascending. What is needed, therefore, is a robot design that is dynamically stable throughout the climbing and descending and does not apply excess pressure to the stairs.

SUMMARY OF THE INVENTION

The present disclosure is directed to robotics, and more particularly to mobile robots capable of climbing stairs in a dynamically stable manner and operate in home environments with one or more of the following features or combinations thereof disclosed herein or in the Detailed Description below.

According to a first aspect, an articulated vehicle comprises: a rigid lower chassis having forward and rearward portions and right and left sides and a top and bottom; front left and front right legs, each leg having a proximal end and a distal end, the proximal end of each leg being pivotally coupled to the rigid lower chassis about the transverse axis generally perpendicular to the sides of the rigid lower chassis in the front half of the rigid lower chassis and the distal end being pivotable at least 180 degrees about the transverse axis without interference from other parts of the articulated vehicle; rear left and rear right legs, each leg having a proximal end and a distal end, the proximal end of each leg being pivotally coupled to the rigid lower chassis about the transverse axis generally perpendicular to the sides of the rigid lower chassis in the rear half of the rigid lower chassis and the distal end being pivotable 360 degrees about the transverse axis without interference from other parts of the articulated vehicle; four articulator motors disposed on the lower chassis and coupled to each leg for pivoting each leg about the transverse axis; a upper chassis having forward and rearward portions and right and left sides and a top and bottom; a middle body with two ends with one end connected to the bottom of the upper chassis and one end connected to the top of the lower chassis; and an articulator motor disposed on the lower or upper chassis and coupled to the middle body for pivoting the upper body forward or backward of the lower body.

According to a second aspect, a method of climbing a stair comprises: driving an articulated vehicle along a drive-direction on each stair, the vehicle comprising: a rigid lower chassis having forward and rearward portions and right and left sides and a top and bottom; front left and front right legs, each leg having a proximal end and a distal end, the proximal end of each leg being pivotally coupled to the rigid lower chassis about the transverse axis generally perpendicular to the sides of the rigid lower chassis in the front half of the rigid lower chassis and the distal end being pivotable at least 180 degrees about the transverse axis without interference from other parts of the articulated vehicle; rear left and rear right legs, each leg having a proximal end and a distal end, the proximal end of each leg being pivotally coupled to the rigid lower chassis about the transverse axis generally perpendicular to the sides of the rigid lower chassis in the rear half of the rigid lower chassis and the distal end being pivotable 360 degrees about the transverse axis without interference from other parts of the articulated vehicle; four articulator motors disposed on the lower chassis and coupled to each leg for pivoting each leg about the transverse axis; a upper chassis having forward and rearward portions and right and left sides and a top and bottom; a middle body with two ends with one end connected to the bottom of the upper and one end connected to the top middle of the lower chassis; an articulator motor disposed on the lower or upper chassis and coupled to the middle body for pivoting the upper body forward or backward of the lower body; driving, while the rigid lower chassis remains rigid and parallel to the ground and the top of the rigid lower chassis remains parallel to the upper chassis, the articulated vehicle to approach a stair with the forward portion of the articulated vehicle; pivoting, while the rigid lower chassis remains rigid, the front legs about the transverse axis from a vertical position next to the lower chassis downward and forward until they touch the top of the step; pivoting, while the rigid lower chassis remains rigid, the back legs about the transverse axis from a vertical position next to the lower chassis downward and forward until they are parallel to the ground; pivoting, while the rigid lower chassis remains rigid and the top of the lower chassis remains parallel to the bottom of the upper chassis, the middle body forward from the rigid lower chassis, moving the upper chassis forward of the rigid lower chassis; pivoting, while the rigid lower chassis remains rigid, the front and back legs about the transverse axis downward and forward and the middle body backward until the rigid lower body is above the stair and the front legs are parallel to the stair; driving, while the rigid lower chassis remains rigid and parallel to the top of the stair, the articulated vehicle forward until the front legs are entirely on the stair; pivoting, while the rigid lower chassis remains rigid, the back legs about the transverse axis forward until they are in a vertical position; driving, while the rigid lower chassis remains rigid and parallel to the top of the stair, the articulated vehicle forward until the back legs are entirely on the stair; and pivoting, while the rigid lower body remains rigid, the front legs backwards and upwards until they are in the vertical position.

DETAILED DESCRIPTION

Figure 1:
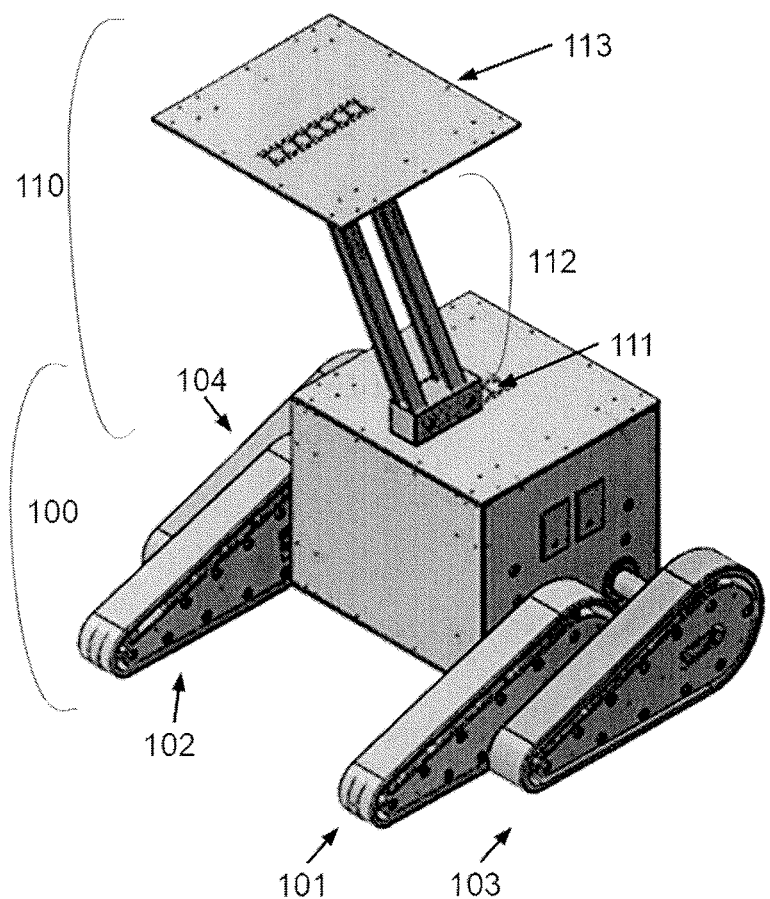
FIG. 1 is a perspective view of an example robot.

The present disclosure is directed to robotics. Preferred embodiments of the present invention will be described herein below with reference to the figures of the accompanying drawings. In the following description, well-known functions or constructions are not described in detail, since such description would obscure the invention in unnecessary detail. For this application, the following terms and definitions shall apply:

The term "computer," as used herein, refers to a programmable device designed to sequentially and automatically carry out a sequence of arithmetic or logical operations, including, without limitation, personal computers, handheld processor-based devices, and any other electronic devices equipped with one or more CPUs, processors or microprocessors.

The terms "processor," "Central Processing Unit" and "CPU," as used herein, refer to processing devices, apparatus, programs, circuits, components, systems, and subsystems, whether implemented in hardware, tangibly embodied in software or both, and whether or not programmable. The terms "processor" and "CPU," as used herein, may include, but is not limited to, one or more hardwired circuits, signal modifying devices and systems, devices and machines for controlling systems, programmable devices and systems, field-programmable gate arrays, application-specific integrated circuits, systems on a chip, systems comprising discrete elements, and/or circuits, state machines, virtual machines, and data processors.

The terms "communicate," "communication," and "communicating," as used herein, refer to both transmitting, or otherwise conveying, data from a source to a destination and delivering data to a communications medium, system, channel, network, device, wire, cable, fiber, circuit, and/or link to be conveyed to a destination.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The robot as described herein is designed mainly for use in people's homes to automate regular chores to give the users more time to do other activities. In many instances the robot may take longer to complete a task than a human or may do so in a different fashion than a human, but it will do so in a partially to fully automated fashion such that the user does not have to do the task themselves or constantly monitor the robot. In the end, the robot will save time for the user so he or she can do more interesting or fulfilling tasks than chores such as exercise, sleep, or watching a football game. The robot is capable of operating in other environments to a limited extent. These include outdoor, office, industrial and public environments. Depending on the actuators, sensors and programming of the robot, the robot may be less effective in these environments; therefore design considerations disclosed herein are focused on the indoor home environment. The numbers and types of chores the robot can handle are limited only by the physical strength and capability of the actuators, the sensor quality and the programming for specific tasks and chores. Thus, a sensor suite may be chosen based upon a particular need.

Figure 2:
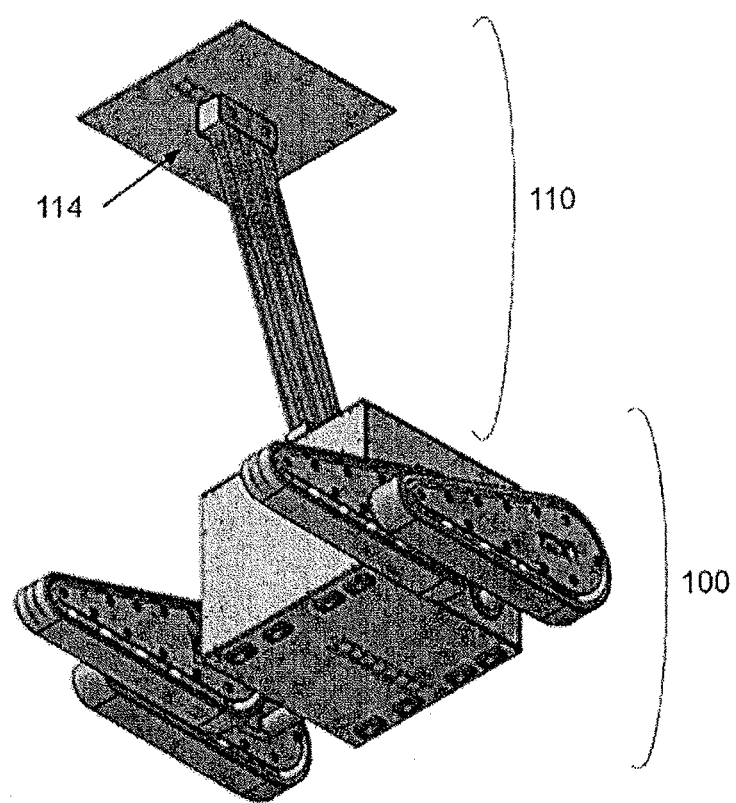
FIG. 2 is a perspective view of the robot of FIG. 1.
Figure 3:
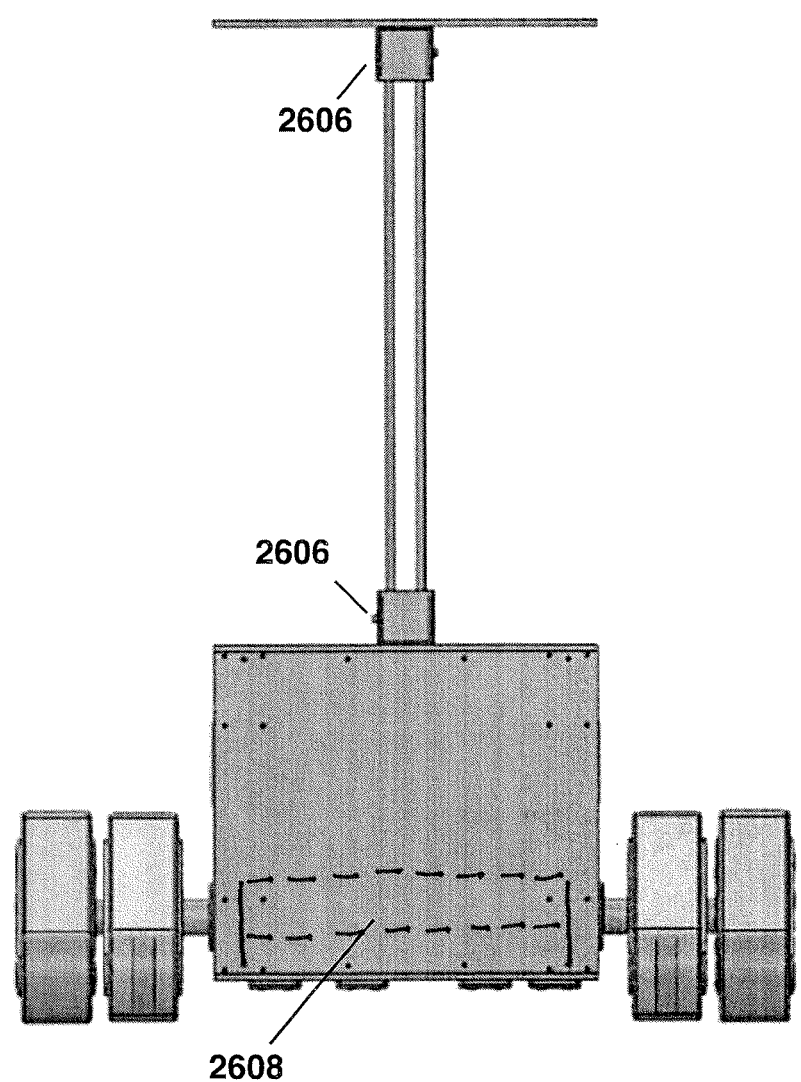
FIG. 3 is a front view of the robot.
Figure 4:
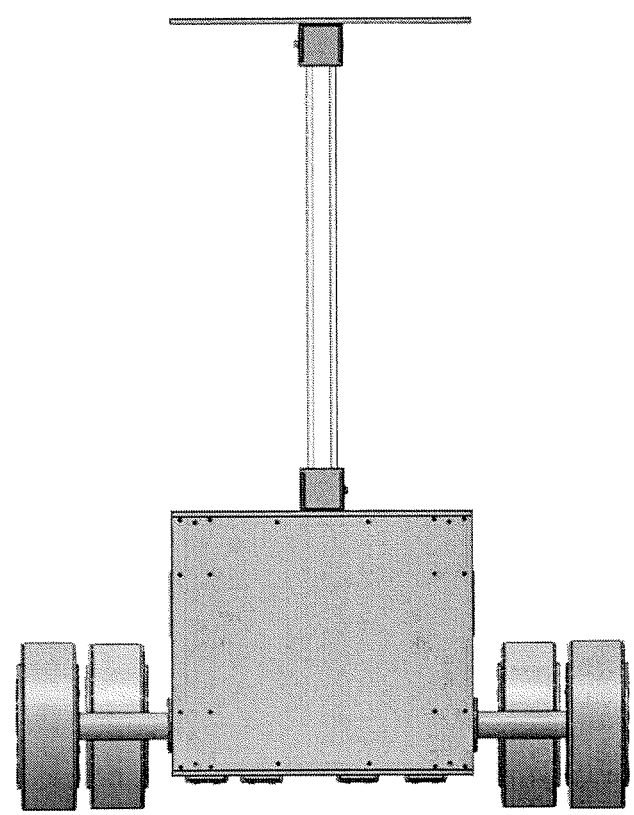
FIG. 4 is a back view of the robot.
Figure 5:
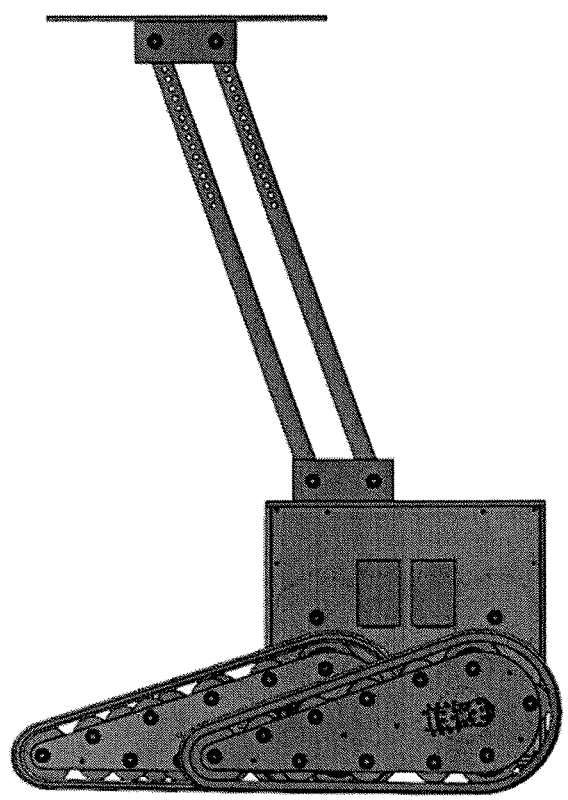
FIG. 5 is a side view of the robot.
Figure 6:
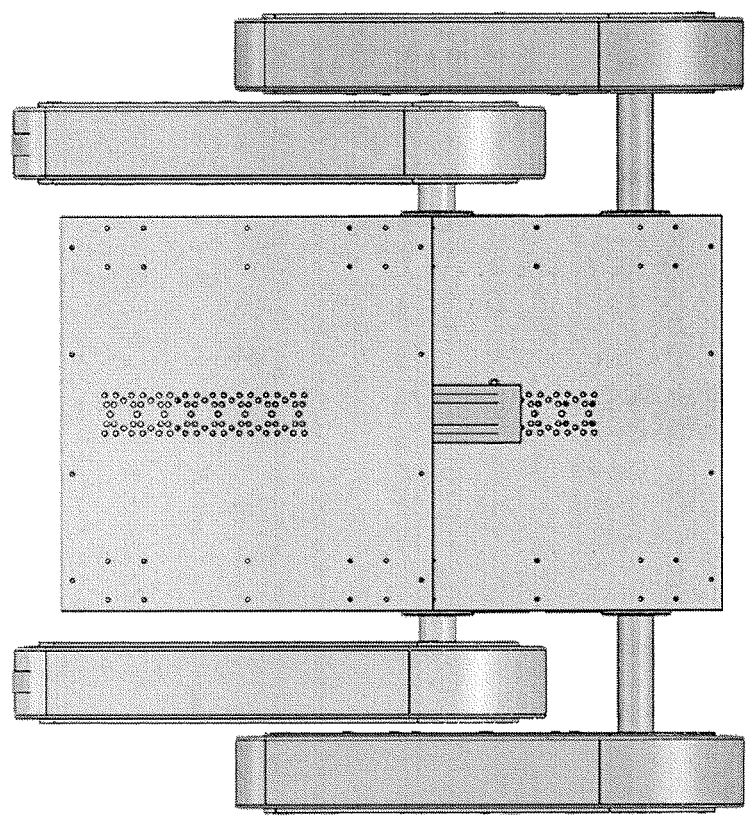
FIG. 6 is a top view of the robot.
Figure 7:
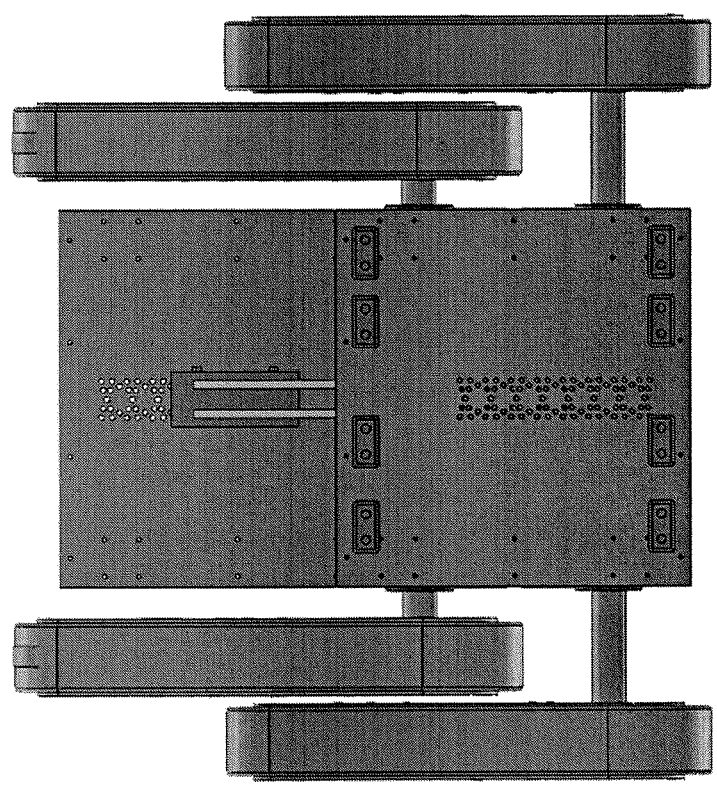
FIG. 7 is a bottom view of the robot.

The robot comprises two main areas: upper and lower body. FIGS. 1 and 2 show the robot from an angle above and below the robot, respectively. FIG. 3 shows the front of the robot. FIG. 4 shows the back of the robot. FIG. 5 shows a side of the robot. FIG. 6 shows the top of the robot and FIG. 7 the bottom.

Lower Body.

As illustrated in FIG. 1, the lower body comprises a lower chassis (100) and four legs: front left (101), front right (102), rear left (103), rear right (104). Each leg is made up of the same parts but are slightly different. The front two legs are mirrors of each other, they are identically sized but the internals are mirrored so that on the left leg the shaft goes out to the right and on the right leg the shaft goes out to the left. The rear two legs are also mirrors of each other. In one configuration, the front legs are slightly longer than the rear legs to make for better leverage and maneuvering when climbing and descending stairs and navigating obstacles. Each leg comprises two parallel walls made of aluminum connected by four metal or plastic spacers. Each spacer is one to two inches long depending on the configuration. Each of the four legs is surrounded by treads or wheels for driving the robot along the horizontal plane in a differential drive configuration (forward, backward, turning like a tank). The treads may be made of a combination of aluminum, steel, flexible plastic, rubber and foam. The treads may be one continuous loop or be made of multiple small treads connected with plastic or metal to create a large loop. In the tread configuration, to support the treads, inside each leg is a series of rollers made of a metal shaft going through a rubber spacer that can spin free on the metal shaft. The spacers keep the treads away from the aluminum walls. The metal shaft goes through each side of both walls and is secured by welding or with nuts. In the tread configuration, three wheels or gears are used to drive the tread and keep the tread from coming off the leg. One wheel or gear is mounted to the front tip of the leg and two wheels or gears are mounted to the back. Each wheel or gear is attached to a metal shaft that connects to the aluminum walls through ball bearings set inside the walls through a press fit. A long shaft is connected to one of the aluminum walls via a weld or a mounting bracket at one end and connects to the lower chassis with one or two ball bearings at the other end. Next to the ball bearings is a shaft collar set so the leg cannot move in or out relative to the lower chassis. The leg shaft in the rear legs is longer than the front legs so that the rear legs are spaced outside the front legs and the rear legs do not touch the front legs when rotated. The front legs are thus limited in rotation as the rear leg shaft is in the way. In one configuration, a motor 2608 (FIG. 26; FIG. 3) is mounted inside the leg to provide power to the wheels or tread. In this configuration, wire is run from the motor, down the leg shaft, and connects to the lower chassis with a slip ring so the legs can rotate freely without tangling any wires. In another configuration, the motor is mounted in the lower chassis and a shaft connected to the motor goes through the leg shaft and provides power to the wheels or treads using gears, roller chain, or pulleys.

As illustrated, the lower chassis may be a six sided box made of metal, such as aluminum or similar material. While the lower chassis is illustrated as a six sided box, other shapes are entirely possible. On top of the lower chassis are a variety of holes for mounting to the upper body and for mounting sensors, arms or other items. On the bottom of the lower chassis are a variety of holes for mounting small sensors including distance sensors (300, FIG. 10) for detecting stairs or negative or positive obstacles. Inside the lower chassis are a variety of objects depending on the configuration. In one configuration, all of the electronics are mounted inside. The electronics can be mounted in any location where they do not interfere with the mechanical system. Electronics are mounted to plastic boards to prevent connection with each other and the lower chassis and protection from mechanical parts. Motors to power the leg treads or wheels can also be mounted inside with shafts going through each leg shaft. Motors to rotate each leg are mounted on the inside of each of the sides of the lower chassis with two motors on each side, one for each leg. In one configuration, a multi stage reduction system using gears, pulleys, or roller chain is built into the side of the chassis to allow for a smaller motor to rotate each leg by reducing the speed and increasing the rotation torque. The top or bottom of the chassis may connect to the rest of the chassis via hinges as a lid to allow for easier access to the inside of the chassis. In this configuration, the lid, either top or bottom, is also connected to the rest of the chassis in a way that the lid does not open accidentally or during regular robot operations. Each side of the chassis is connected to the other sides with metal brackets and screws. The brackets are designed and mounted such that the sides and top and bottom of the chassis cannot bend or flex.

Upper Body.

Figure 8A:
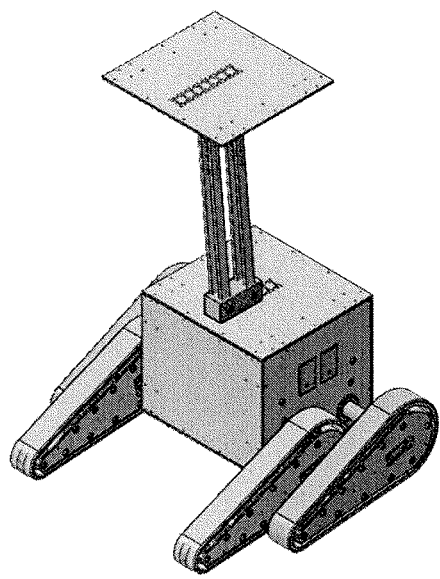
FIGS. 8A through 8C illustrate views of different potential necks connecting the upper and lower body.
Figure 8B:
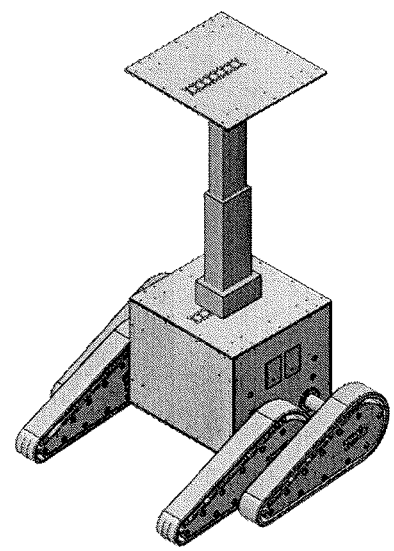
Figure 8C:
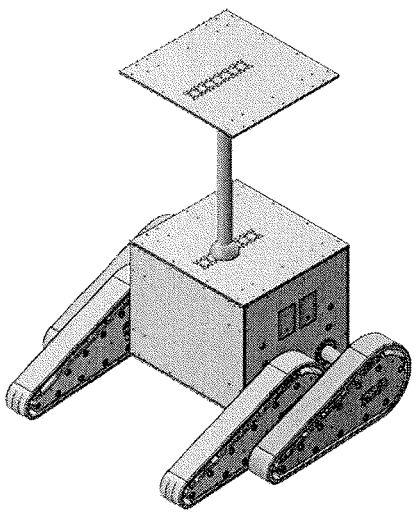
Figure 26:
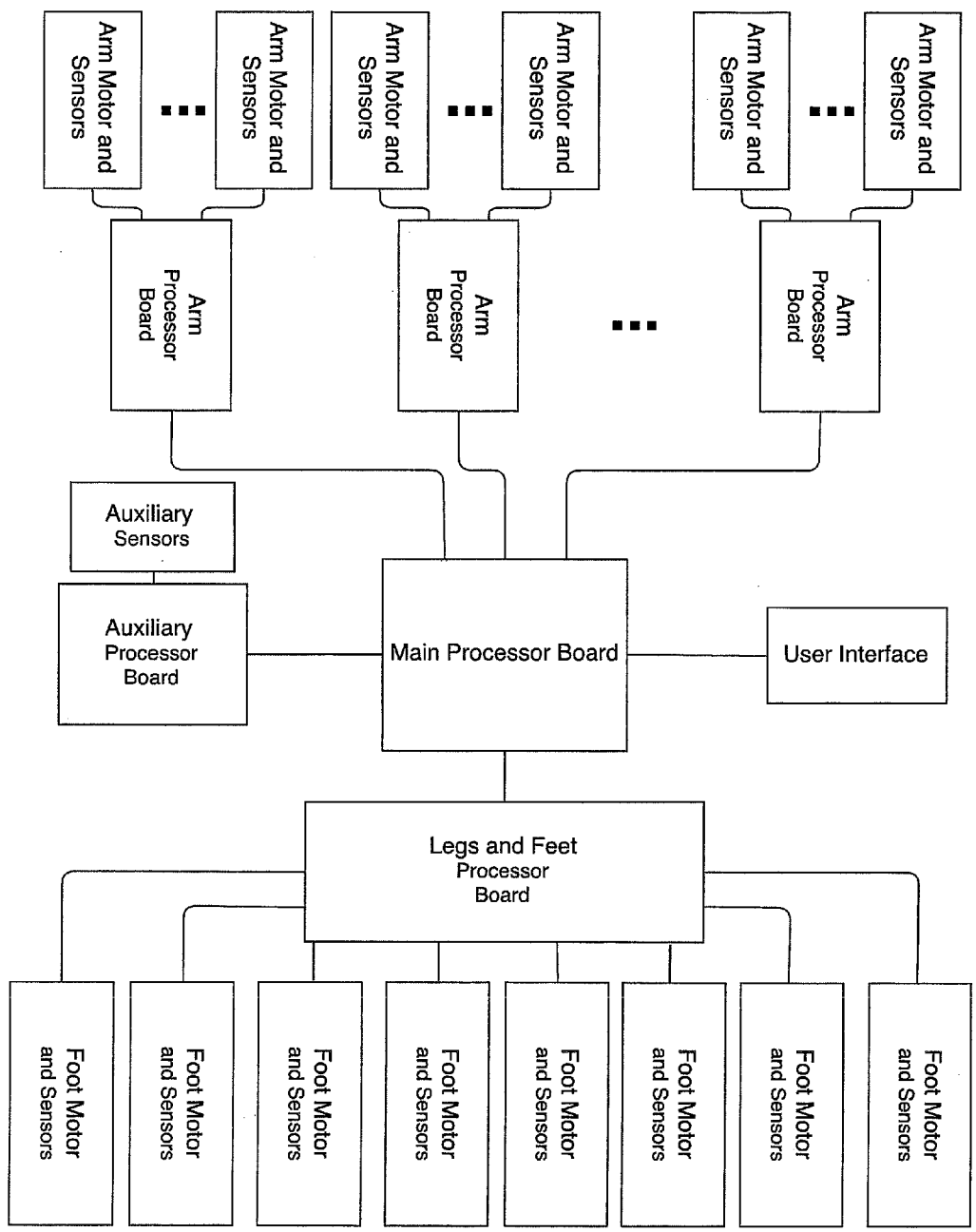
FIG. 26 shows the connections between the electronics boards, motors, sensors, and interfaces.

The upper body (110), as shown in FIGS. 1 and 2, comprises a mounting plate or other surface (113), sufficient weight that can change the center of mass an appropriate distance for maneuvering in uneven environments and stair climbing, and various potential configurations of sensors or effectors (actuators or other methods to interact with the environment). The upper body (110) and the lower chassis (100) are connected in such a way that the upper body can be moved forward or backward to change the center of mass of the entire system sufficiently for safe maneuvering in uneven environments and stair climbing. The upper body may also be used to carry items on top of the robot to complete tasks. The mounting plate connects to the upper shaft mount (114), then to a long shaft (112) and a lower shaft mount (111). The lower shaft mount connects to the lower chassis (100). The long shaft (112) can be designed in multiple ways, including: four parallel shafts (FIG. 8A), single telescoping shaft (FIG. 8B), single shaft with articulator motors 2606 at either end (FIG. 8C; FIG. 26; FIG. 3). Other suitable configurations are possible. The mounting plate (113) is made of aluminum or durable plastic and has a variety of pre drilled holes used for attaching walls, boxes, arms, sensors and other items directly onto the mounting plate. The long shaft (112) is controlled via motors and can angle forward or backwards, moving the mounting plate (113) forwards or backwards over the lower body. This movement changes the center of mass of the entire robot and is used to climb and descend stairs safely (see FIGS. 11A-11D, 12A-12F, 13A-13E, 14A-14E, 15A-15E), and navigate over positive obstacles (see FIGS. 16A-16H) and negative obstacles (see FIGS. 17A-17E). Additional mass may be attached to the mounting plate on the top or bottom as needed. In one configuration the batteries are placed in the front of the mounting plate to provide additional mass. As more mass is placed on mounting plate the center of mass of the entire robot can be shifted more forwards or backwards. In certain aspects, the mass may be dynamically shifted during operation to counter, for example, an imbalance.

Depending on the configuration of the long shaft (112), the upper shaft mount (114) and lower shaft mount (113) are designed differently. In the four parallel shafts configuration (FIG. 8C), both mounts are the same. Each comprises two parallel aluminum or steel shafts mounted on steel ball bearings that are attached to a mounting bracket. The mounting bracket is also attached to the mounting plate for the upper shaft mount or the lower body for the lower shaft mount by screws or welding. The four parallel shafts each have holes at the ends through which the parallel aluminum or steel shafts are threaded. The shafts are set in place with shaft collars. As the upper shaft mount moves forwards or backwards all four shafts making up the long shaft (112) move together and remain parallel to each other. In one configuration a linear motor is attached two of the four parallel shafts at one end and to either the mounting plate (113) or the lower body at the other end. As the shaft extends or contracts the mounting plate moves forwards or backwards. In another configuration a servo motor is attached to one or two of the parallel shafts and either the mounting plate or lower body. As the servo rotates the mounting plate moves forwards or backwards. In the other configurations of the long shaft (FIGS. 8A and 8B) similar motor or servo mounting will result in similar movement of the mounting plate. In the single telescoping shaft (FIG. 8B) configuration of the long shaft (112), multiple pieces of aluminum or steel are nested inside each other. These pieces can extend or retract. In one configuration, a linear servo inside the shaft extends and contracts the shaft. If the mounting plate is forward of the lower body and the shaft extends then the center of mass of the robot moves forward and upwards. If the shaft contracts the center of mass of the robot moves backwards and downwards.

Figure 9A:
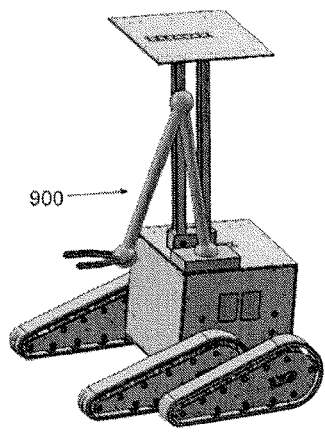
FIGS. 9A through 9D illustrate views of different arm configurations.
Figure 9B:
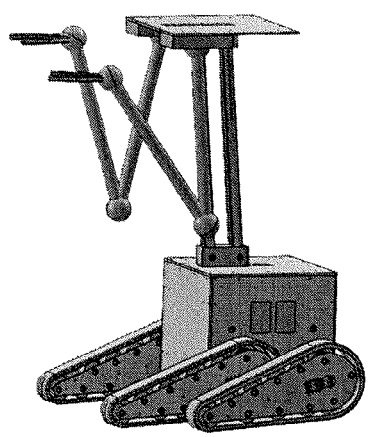
Figure 9C:
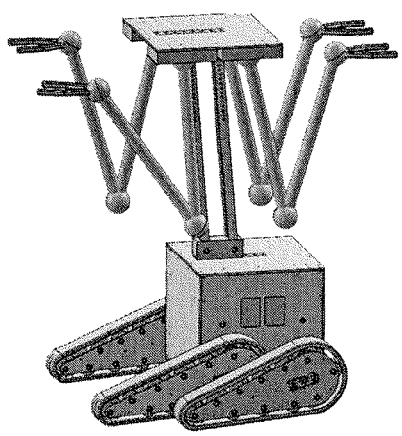
Figure 9D:
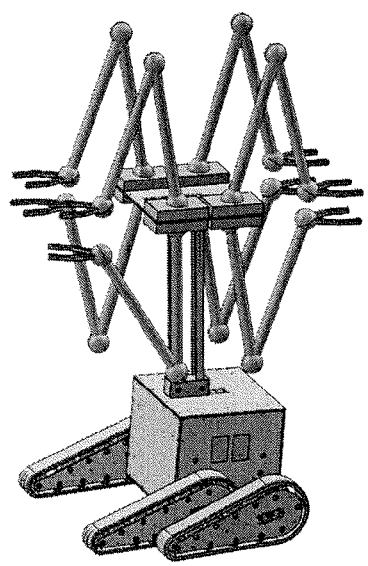

Arms. To interact with the environment the robot may have one or more arms (900, see FIGS. 9A-9D). Each arm has sufficient degrees of freedom and strength to complete tasks described elsewhere. Each arm has an end effector, generally a multi fingered pincer or hand, to complete tasks. Arms may be placed in a variety of locations depending on the needs of specific tasks. The arms are designed to safely tuck into or near the upper body of the robot. In one configuration, the robot has eight arms (FIG. 9D). In configurations of more than one arm, the robot is able to maneuver each arm independently and coordinate movements between arms to best complete tasks. The arms may be used to additionally support the robot during delicate maneuvers such as ascending or descending stairs and navigating over large objects.

Climbing Stairs.

Figure 11A:
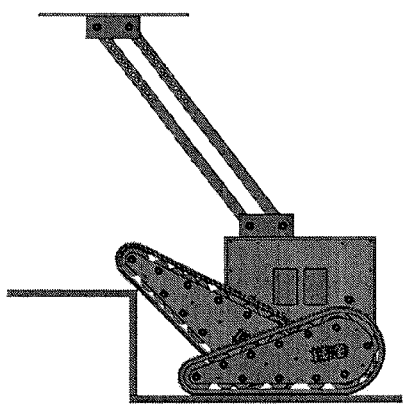
FIGS. 11A through 11D depict the movement of the robot climbing a single stair.
Figure 11B:
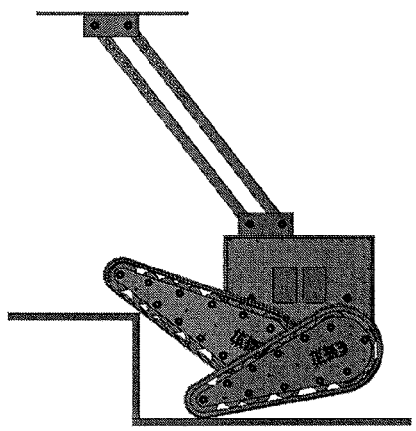
Figure 11C:
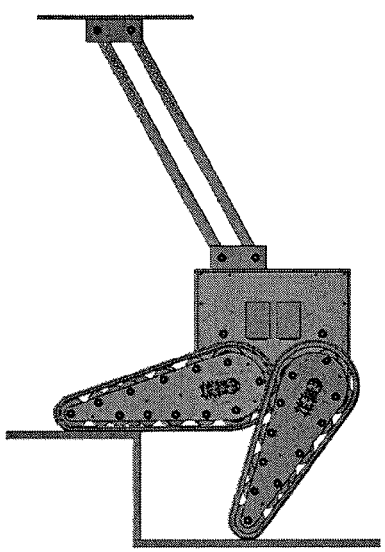
Figure 11D:
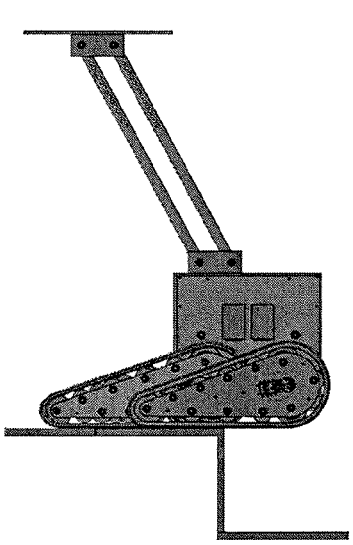
Figure 12A:
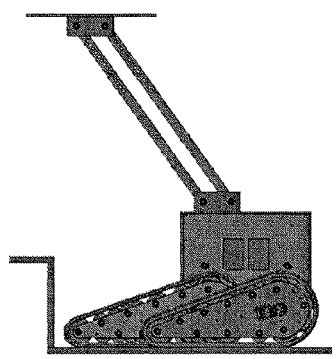
FIGS. 12A through 12F depict the movement of the robot climbing or descending multiple stairs.
Figure 12B:
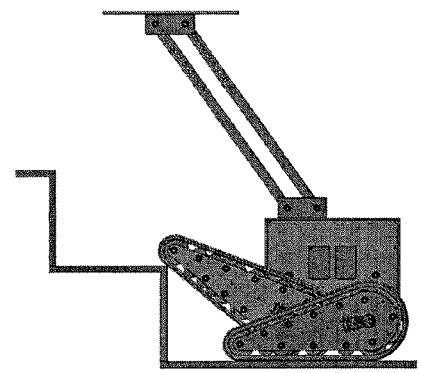
Figure 12C:
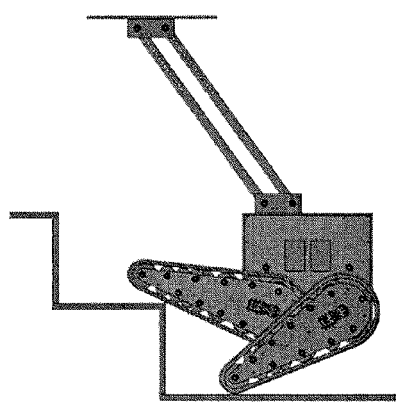
Figure 12D:
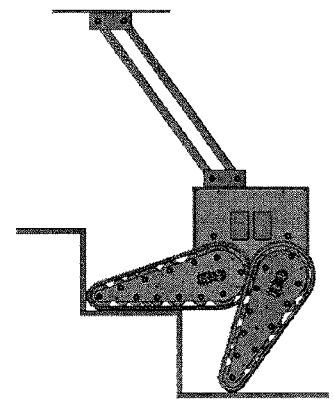
Figure 12E:
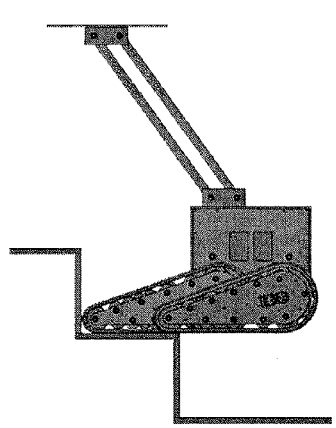
Figure 12F:
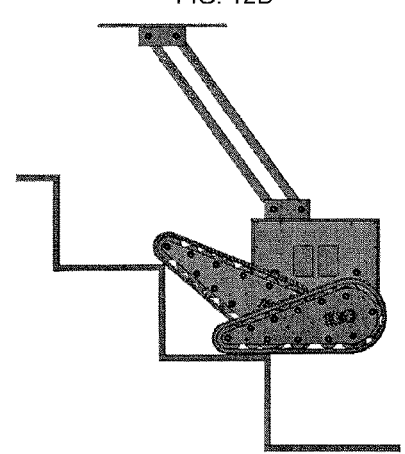

To climb a series of stairs, the robot transitions between five configurations of the center of mass and legs (see FIGS. 11A-11D for a single stair, FIGS. 12A-12F & 20 for multiple stairs). The robot starts with both front legs point forward and rear legs pointing forward, parallel to the ground plane (FIG. 12A). The front legs lift to an angle sufficient to touch the top edge of the stair and the robot drives forward so that the front legs are touching the top stair (FIGS. 11A & 12B & 2001). The upper body moves forward until the center of mass of the robot is in between the point where the front legs are touching the stair and the front tip of the back legs (2002). All four legs move forward to lift the robot (FIGS. 11B & 12C & 2003) to the height of the second stair as the robot drives forward to maintain contact on both the stair and the ground plane (FIGS. 11C & 12D). The upper body moves forward or backward to keep the robot center of mass between where the front legs touch the top stair and the back legs touch the bottom stair. Once the lower body chassis is high enough to clear the stair, the robot drives forward (2004) while rotating the front legs to point upward until the rear legs hit the front stair. The upper body moves backward to keep the center of mass of the robot between the front and rear leg contact points. The lower legs rotate forward until they are pointing forwards and parallel to the top stair, completing the step and returning the legs and upper body to their configuration before the platform climbed a stair (FIGS. 11D & 12E). The process is repeated for every new stair. The first step is depicted in FIG. 12F. If the robot is passed the top stair (2005), the robot continues with normal operations (2006).

To climb a single stair the robot can maneuver the same as if climbing multiple stairs (FIGS. 11A-11D) or a different process containing four configurations. Starting facing the stair with the front legs pointed forward and the back legs pointed backward, first the robot lifts the front legs so they are touching the top edge of the stair. Second, all four legs rotate to lift the robot above the stair while slowly driving the robot forward. Third, the robot drives forward until the rear legs touch the stair. Fourth, the rear legs lift to or above parallel relative to the stair. The entire process is similar to descending a single stair as depicted in FIGS. 13A-13E (reverse order to go up stair backwards) and FIGS. 14A-14E (reverse order to go up the stairs forward).

Down Stairs.

Figure 19:
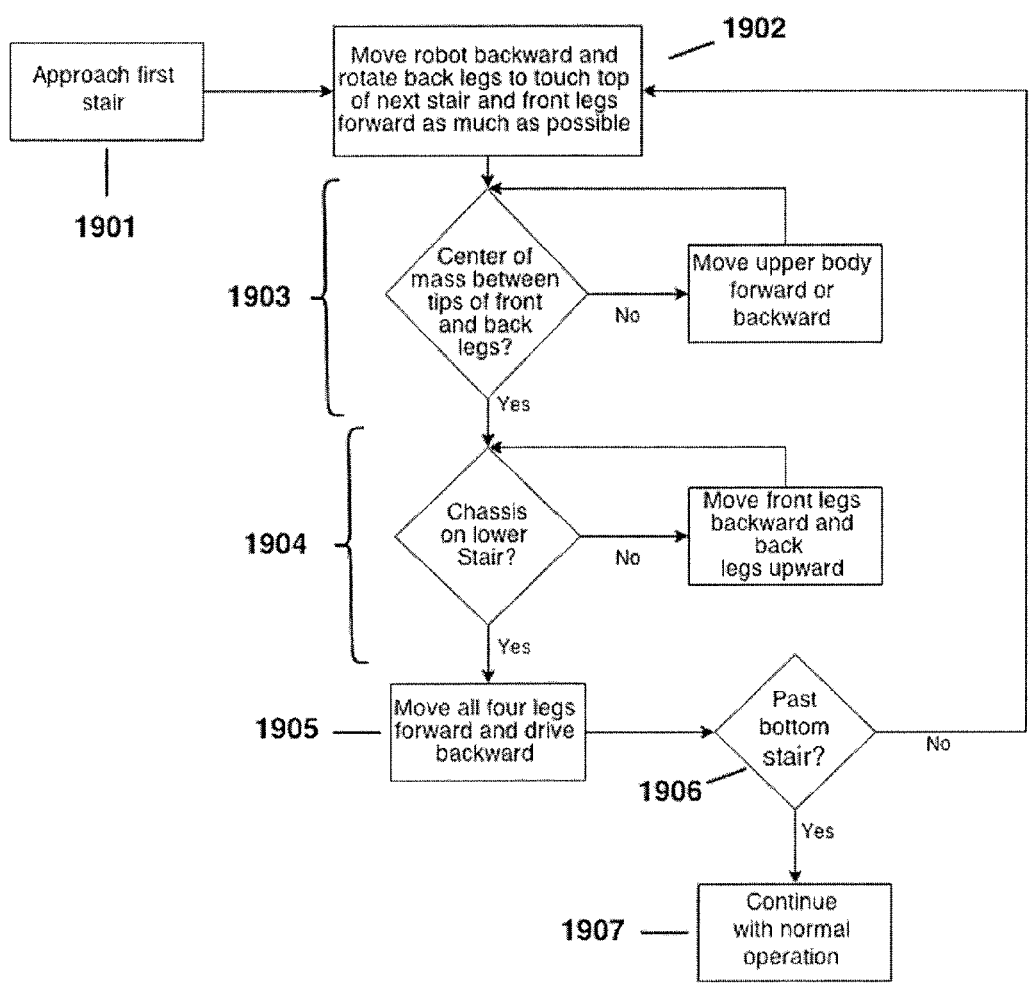
FIG. 19 shows a flow chart of the robot descending multiple stairs.
Figure 20:
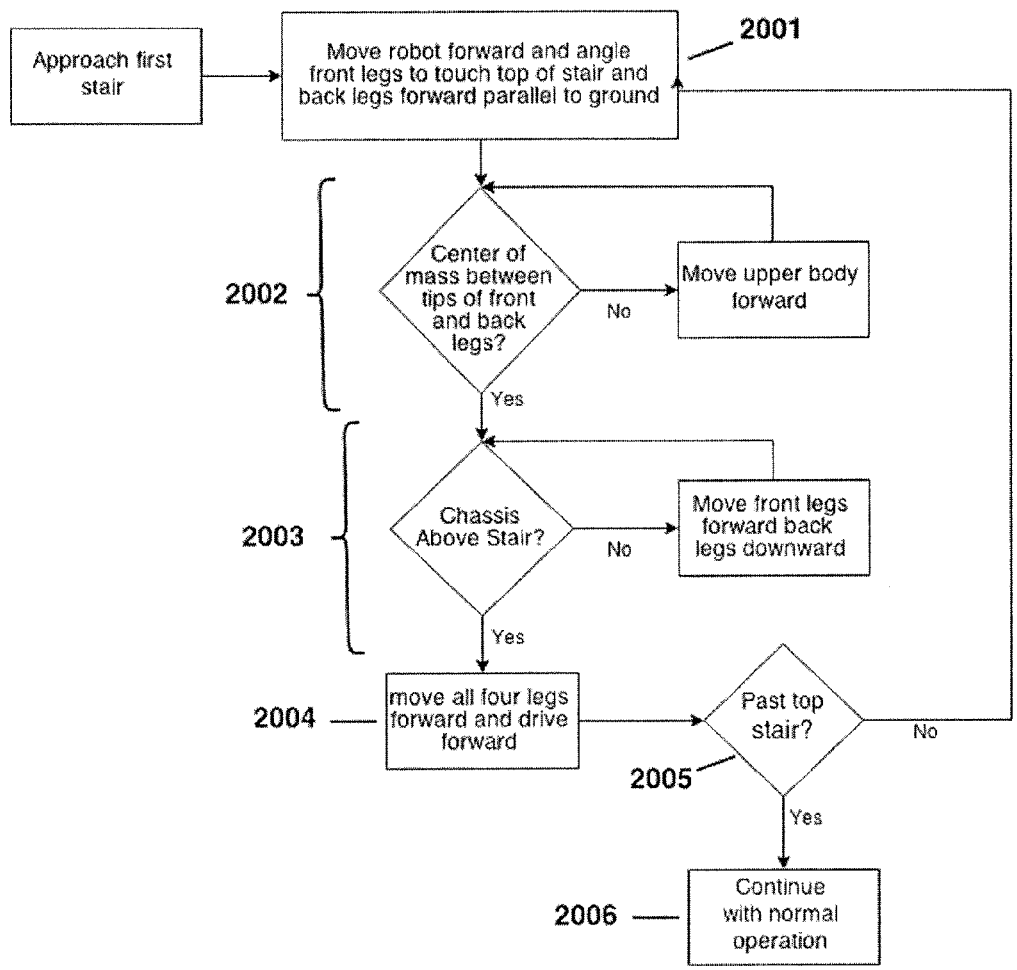
FIG. 20 shows a flow chart of the robot ascending multiple stairs.

Stairs can be traversed down in a manner similar to climbing. For going down multiple stairs, the process and positioning is the same as in going up stairs but in reverse order. FIG. 19 is a flow chart of the process. After facing backwards and approaching the first stair (1901), the back legs rotate backwards until they touch the top of the next stair down and the front legs move to point forward and parallel to the ground (1902). Then the upper body is moved to put the center of mass between the front and back legs (1903) and the robot moves backwards until there is sufficient room below the robot to complete the stair descending maneuver. While maintaining the center of mass between the touch points on the front and back legs to the stairs, the front legs move backward and the back legs upward. Finally all for legs move forward and the robot drives backwards (1905) until it reaches the next stair (1906) or continues with normal operation (1907).

Figure 13A:
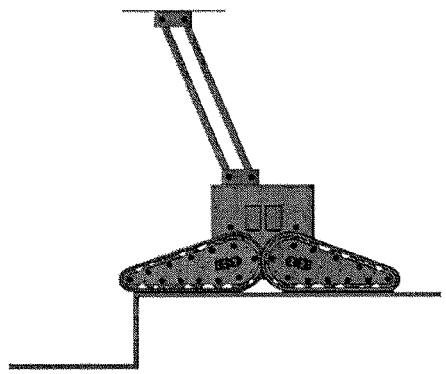
FIGS. 13A through 13E depict the movement of the robot descending a single stair while facing forward.
Figure 13B:
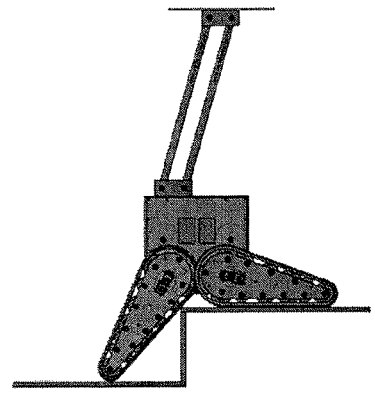
Figure 13C:
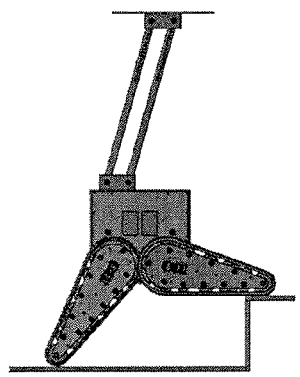
Figure 13D:
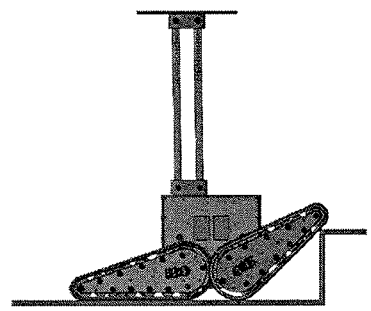
Figure 13E:
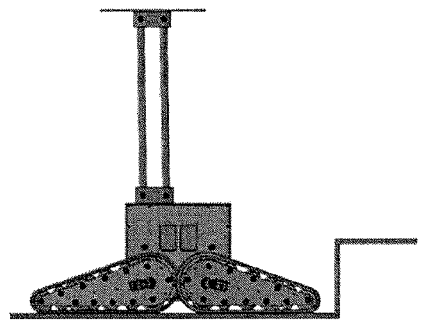
Figure 14A:
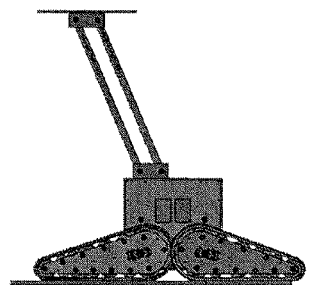
FIGS. 14A through 14E depict the movement of the robot descending a single stair while facing backward.
Figure 14B:
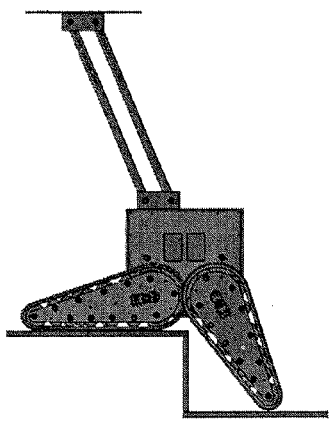
Figure 14C:
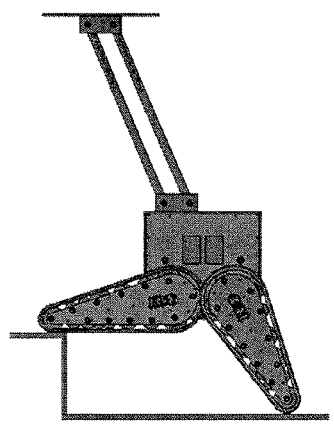
Figure 14D:
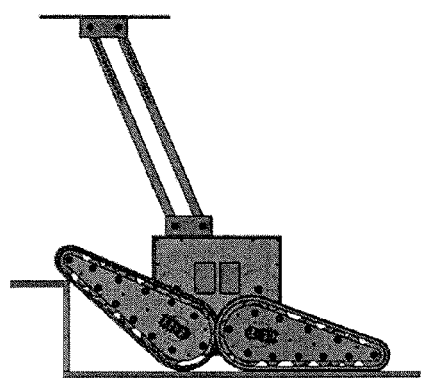
Figure 14E:
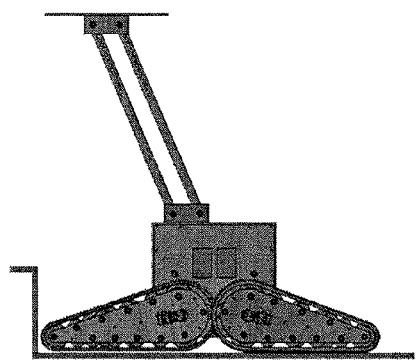
Figure 18:
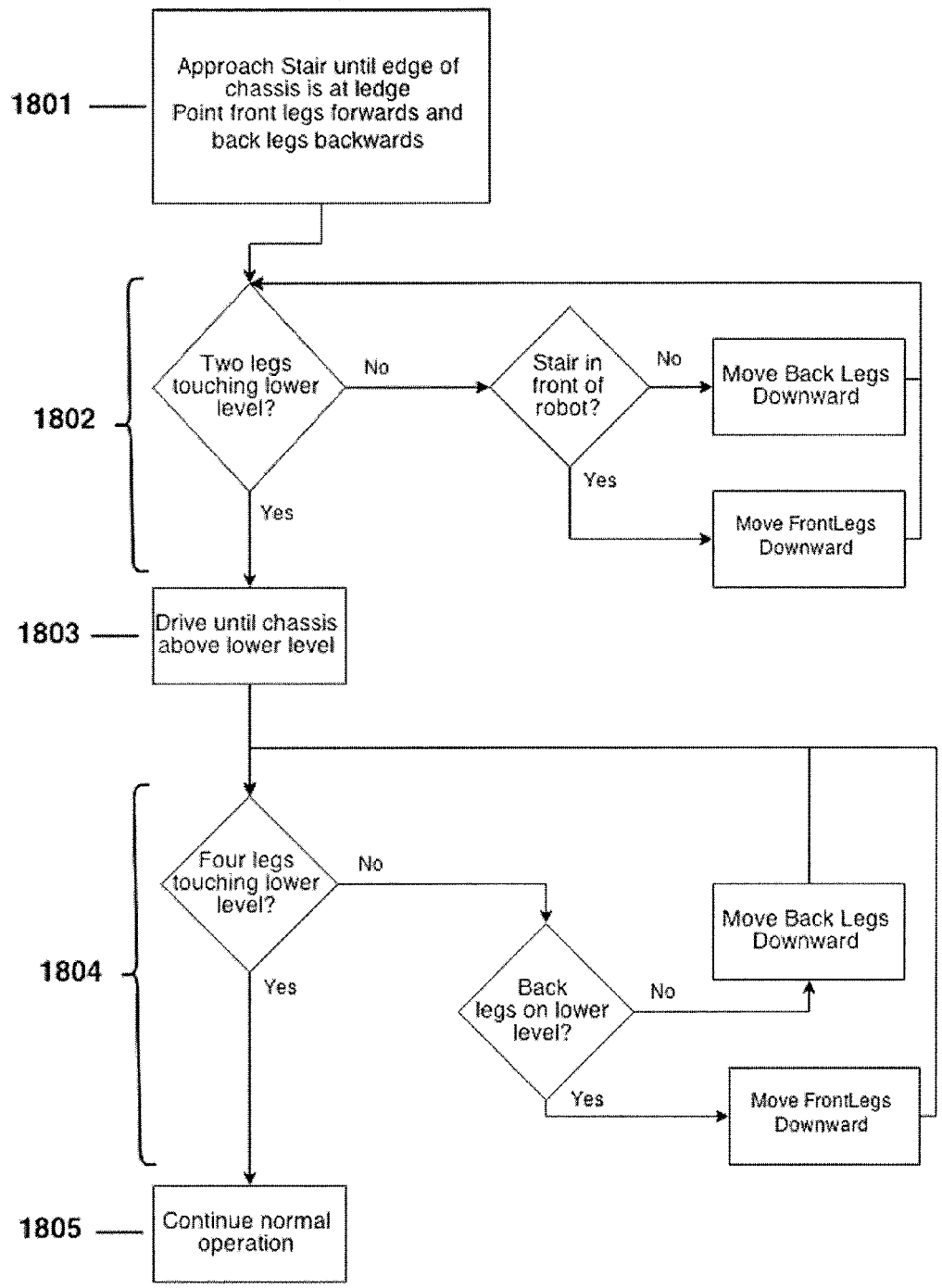
FIG. 18 shows a flow chart of the robot descending a single stair.

For going down a single stair, the robot can traverse the same as going down multiple stairs or by a different method demonstrated in FIGS. 13A through 13E and 14A-14E and a flow chart in FIG. 18. First, with the robot going either forwards (FIGS. 13A-13E) or backwards (FIGS. 14A-14E) with all four legs extended away from the robot parallel to the ground (FIGS. 13A & 14A & 1801), the robot traverses the stair by driving over the stair while moving the legs on the stair down until they touch the ground below the stair (FIGS. 13B & 14B & 1802). The robot continues to drive in the same direction until the lower chassis is above the lower level (1803). The robot continues to drive in the same direction and as the second set of legs are going over the stair (FIGS. 13C & 14C), those legs angle upwards while the first set of legs do the same to keep the robot level and lower the robot chassis to the level below the stair (FIGS. 13D & 14D & 1804). Once the second set of legs have touched the level below the stair, the robot has completed the step down motion. Finally the robot drives away and returns the legs to their original positions (FIGS. 13E & 14E & 1805).

Up and Down Stairs at Angle.

Figure 15A:
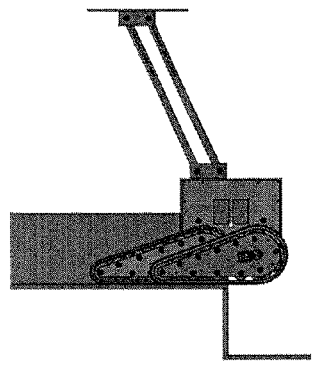
FIGS. 15A through 15E depict the movement of the robot ascending or descending a stair at an angle to the previous stair.
Figure 15B:
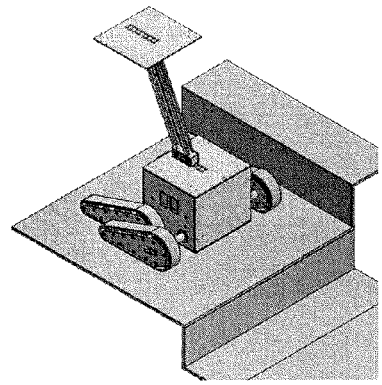
Figure 15C:
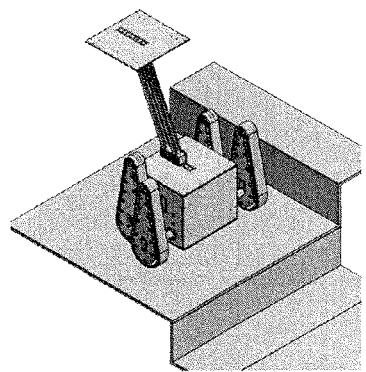
Figure 15D:
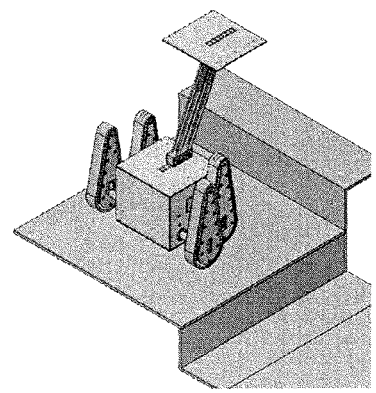
Figure 15E:
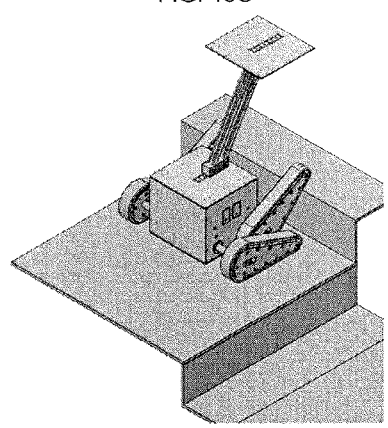
Figure 25:
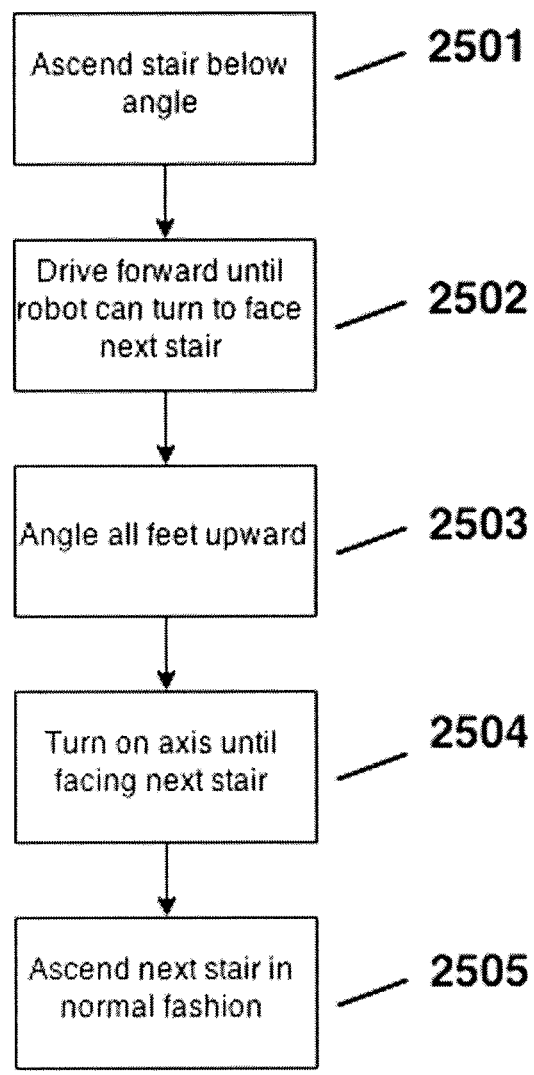
FIG. 25 shows a flow chart of the robot ascending a stair at an angle to the previous stair.

Stairs that do not rise straight forward but instead have bends in them between forty five and ninety degrees are common in many households. Some stairs can bend less than forty five degrees and prove to be a challenge even for humans to climb. For the robot to ascend or descend stairs that are at an angle with respect to each other, there should be sufficient space for the robot, while on one stair, to maneuver to the left or right to have sufficient surface area to move onto the next step in a fashion similar to climbing straight stairs. FIGS. 15A-15E show visually the process of maneuvering up or down and angled stair and the flow chart on FIG. 25 show the specific steps. After completing the previous stair (FIG. 15A & 2501) and confronting an angled stair (FIG. 15B & 2502), first, if possible while remaining stable, the robot points all legs upward (FIG. 15C & 2503). Then the robot rotates left or right so that it is facing directly toward the angled stair (FIG. 15D & 2504). If there is not enough room on the shorter side of the stair the robot is on to extend the back legs in the regular ascending or descending motion then the robot moves toward the larger side of the stair until sufficient space is available. Then the robot ascends or descends the next stair (2505) in the same fashion as described earlier (FIG. 15E for first position).

Positive Obstacles.

Figure 16A:
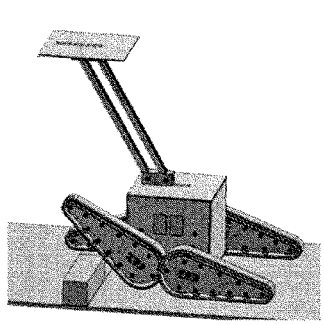
FIGS. 16A through 16H depict the movement of the robot navigating over a positive obstacle.
Figure 16B:
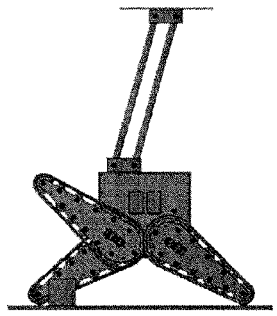
Figure 16C:
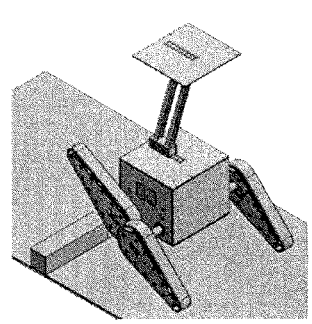
Figure 16D:
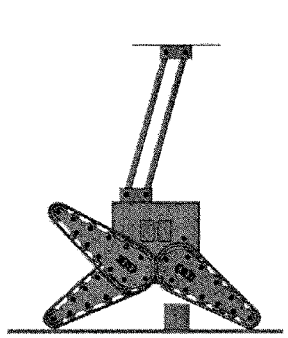
Figure 16E:
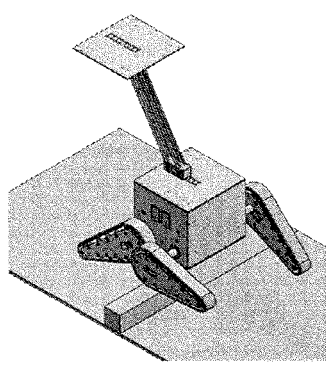
Figure 16F:
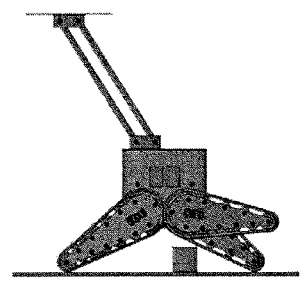
Figure 16G:
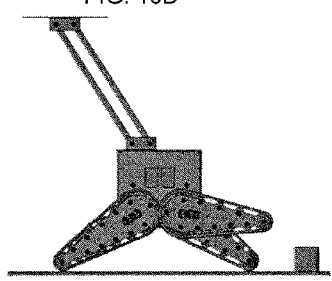
Figure 16H:
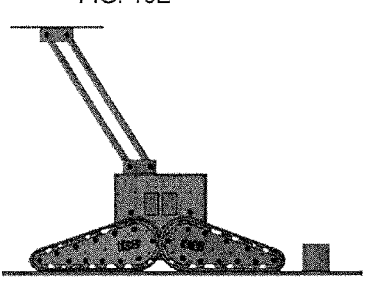
Figure 24:
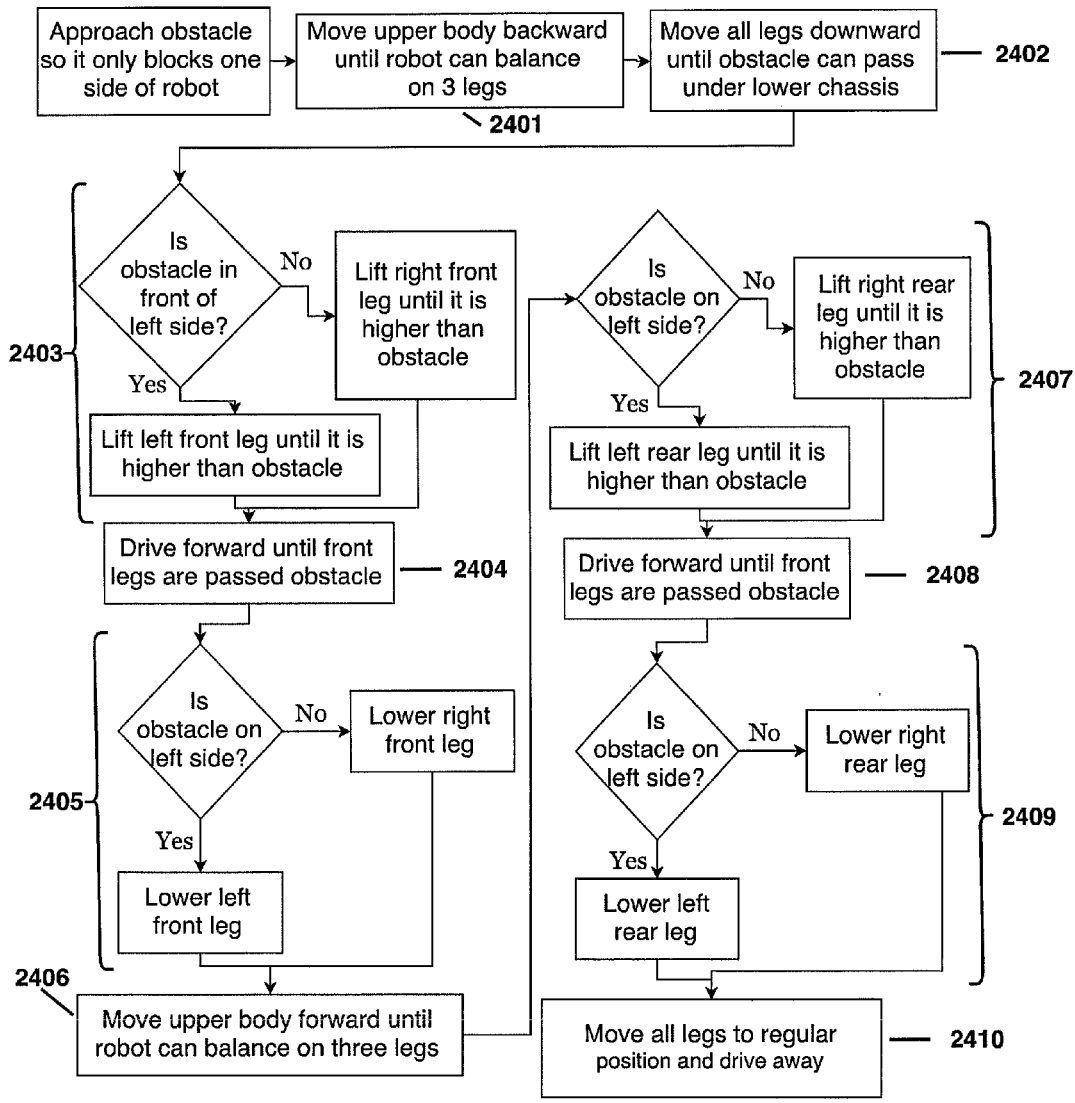
FIG. 24 shows a flow chart of the robot navigating a positive obstacle covering one side of the robot.

Positive obstacles (hills, bumps, cords, etc.) are commonplace in home and can be traversed in a variety of ways depending on the shape and strength of the obstacle. Small obstacles can be driven over. If the obstacle cannot support the weight of the robot, the robot can balance on two or three legs, depending on whether the obstacle affects one or two legs, and drive over without touching the obstacle. Taller obstacles can be driven over by all four legs pointing down to raise the height of the lower chassis high enough to clear the obstacle. If a leg must be raised to go over the obstacle, the robot performs a set of maneuvers to traverse the obstacle in a process shown in the flow chart in FIG. 24 and pictorially in FIGS. 16A-16H. The robot points the front legs forward and back legs backward. Next the upper body moves backward so the robot can balance on three legs and the front leg affected by the obstacle is lifted (FIG. 16A & 2401). Next all of the legs move downward until the lower chassis can clear the obstacle (2402). Next, depending on where the obstacle is located, the robot lifts the leg in front of the obstacle (2403), either the front left or front right (FIGS. 16B & 16C). Then the robot drives forward until the front leg is clear of the obstacle (FIG. 16D & 2404). The front leg moves down until it touches the ground (2405), then the upper body moves forward until the robot can balance on three legs (2406) and the back leg affected by the obstacle is lifted until it can clear the obstacle (FIGS. 16E & 16F & 2407). Then the robot drives forward until the back leg clears the obstacle (FIG. 16G & 2408). Finally, the rear leg moves down until it touches the ground (2409) and all legs are lowered until they are parallel to the ground and the robot continues normal operation (FIG. 16H & 2410).

Negative Obstacles.

Negative obstacles (holes, dips, etc.) can be traversed in multiple ways depending on the size and location of the obstacle. Holes not longer than the length of a leg can be driven over by a leg parallel to the ground without any need for other manipulation or maneuvering.

A negative obstacle longer than the length of a leg but not as deep as the length of the leg can be traversed by angling the leg on top of the obstacle into the obstacle while maintaining contact on part of the ground. If need be to return the leg to the appropriate position, the other legs may lift up the lower chassis.

Figure 22:
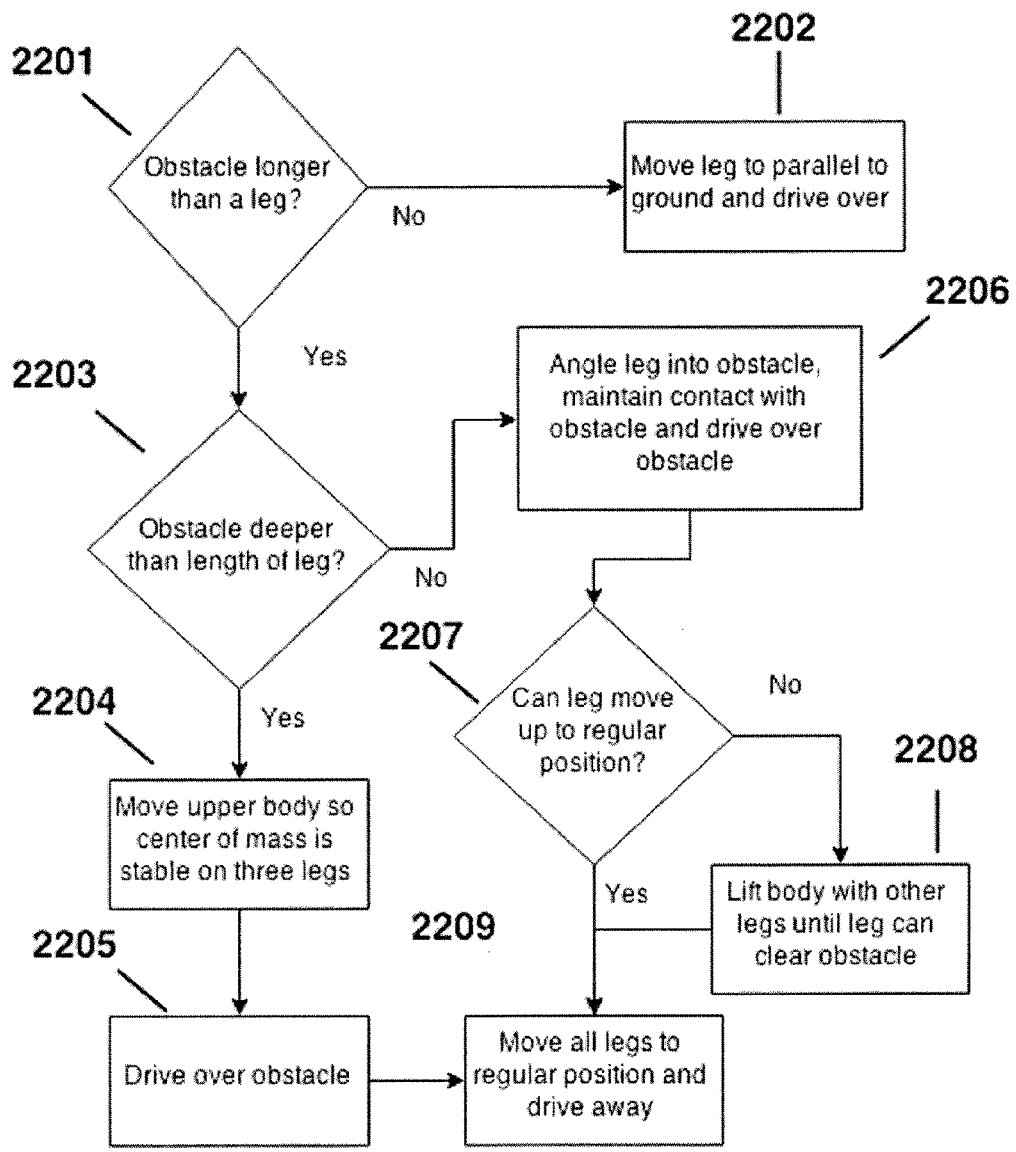
FIG. 22 shows a flow chart of the robot navigating a negative obstacle affecting one leg at a time.

A negative obstacle deeper and longer than a single leg but only affecting a single leg at a time can be traversed by moving the upper body such that the robot's center of mass is fully supported and stable on three legs. The flow chart in FIG. 22 shows the entire process. If the obstacle is no longer than a single leg (2201) then the affected leg is moved parallel to the ground plane and the robot drives over the obstacle (2202). If the obstacle is longer than a leg and the obstacle is deeper than the length of a leg (2203) then the robot moves the upper body so the center of mass is stable on three legs (2204) and drives over the obstacle (2205). Alternatively, if the obstacle is longer than a leg (2201) but not deeper than the length of a leg (2204), the robot can do the above maneuver or use the obstacle to keep greater stability by angling the leg into the obstacle and drive over the obstacle while maintaining contact with the obstacle (2206). If the robot cannot move the leg out of the obstacle on its own (2207) then the whole body is lifted with the other legs until the leg can clear the obstacle (2208). Finally, in any case, once past the obstacle the robot moves all legs to regular positions and drives away (2209).

Figure 17A:
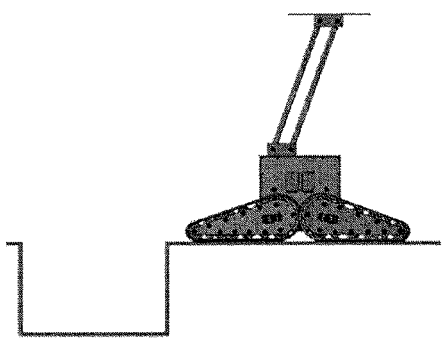
FIGS. 17A through 17E depict the movement of the robot navigating over a negative obstacle.
Figure 17B:
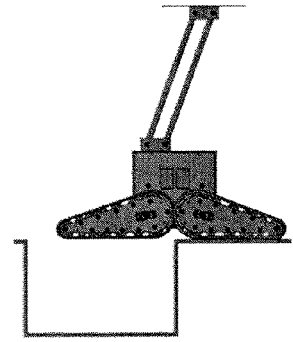
Figure 17C:
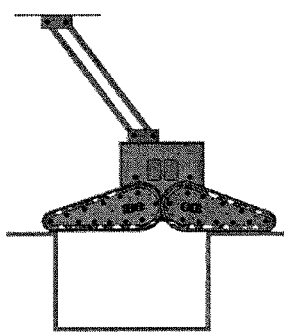
Figure 17D:
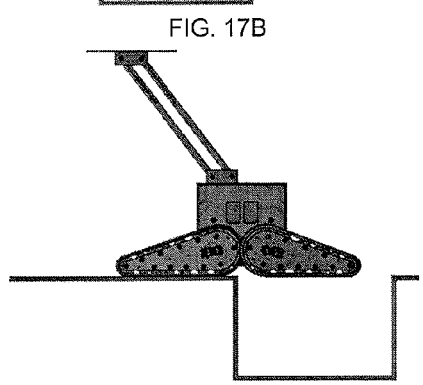
Figure 17E:
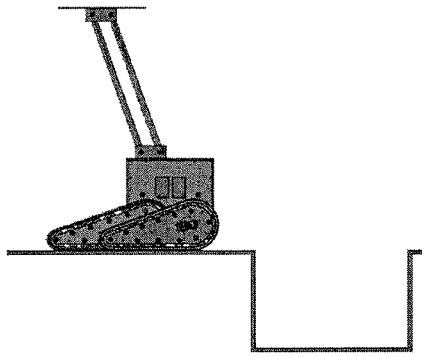
Figure 23:
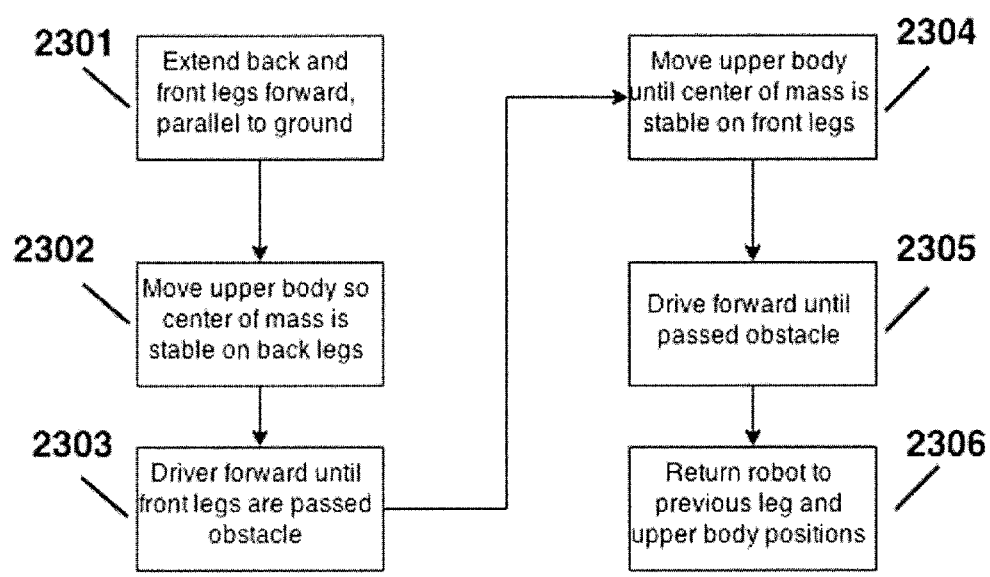
FIG. 23 shows a flow chart of the robot navigating a negative obstacle wider than the width of the robot.

Negative obstacles affecting two legs at the same time can be traversed in a similar manner described for one leg, repeating the same motion on both affected legs as shown in the flow chart in FIG. 23. First, the front legs point forward and back legs backward (2301), all parallel to the ground, and the upper body moves so the center of mass is over the back legs (FIG. 17A & 2302). Then the robot drives over the obstacle (FIG. 17B & 2303) until the front legs are passed the obstacle. Next the upper body moves forward so the center of mass is over the front legs (FIG. 17C & 2304). Then the robot drives forward (FIG. 17D) until the back legs are passed the obstacle (2305). Finally, the robot returns to a normal configuration (FIG. 17E & 2306) and resumes normal operations.

Disassembly for Transport.

The robot may be able to disassemble into two pieces for transport. The upper body and lower body can be separated at the base of the upper body. The resulting two pieces should be more easily carried by a single person. Depending on the configuration, the legs may be able to detach from the lower body, shrinking the footprint of the lower body for easier carrying.

Record Data.

The robot is able to record sensor data, robot state, and actuator motions in a variety of places. Lower level control boards can store data coming from connected sensors and any actuator commands and other data coming from the main computer board. The main computer board can store data coming from the lower level control boards, any sensors connected directly to the main computer board, current vehicle state, and commands sent to actuators.

Lock to Safe Mode.

There may be a variety of circumstances where the robot will need to lock itself in place in a safe configuration, a configuration where it cannot be easily destabilized by an external action. Though the robot is always in a stable configuration, there are delicate maneuvers, especially in ascending and descending stairs, where the robot could be tipped over with a force attainable by a person of regular strength. The main scenarios for desiring a safe mode include detecting nearby people when performing a delicate maneuver, a bad sensor or a bad actuator that does not respond to control commands. A safe configuration is where all four legs are connected to the same ground plane. On flat or slightly bumpy surfaces this is easily attained. The only issue is when the robot is crossing large positive or negative obstacles or climbing up or down stairs. For crossing large obstacles, the robot can decide to either complete the obstacle navigation, return to the safe state before climbing the obstacle, or lock all motors in place. For stair climbing, the safest position when in the middle of ascending is to revert to the start position of climbing the current stair. When descending, the safest movement is either to complete the current stair descent or if early in the descent, revert to the starting position for that stair descent. Depending on the configuration by the user, the robot may be able to do a slow completion of the delicate maneuver under the direct supervision of the user. This allows for events where the user is confident the robot can complete the maneuver in its current physical state and desires the robot to be in a safer location for troubleshooting or disassembly. During an emergency on the robot during a stairs ascent or descent, the robot or user can turn off the motors to the legs and treads. Depending on the motor configuration, the stair climbing maneuver is designed such that when the motors are turned off, the robot will either stay in place or slowly descent onto the lower step, still maintaining a stable balance. Depending on external forces, including anything the robot is carrying, the robot may leave the stable state and be unable to control itself given it has no power going to the motors. As such, this part of the design is only to be utilized in emergency situations under the supervision of the user.

IR Stair Ledge Sensors.

Figure 10:
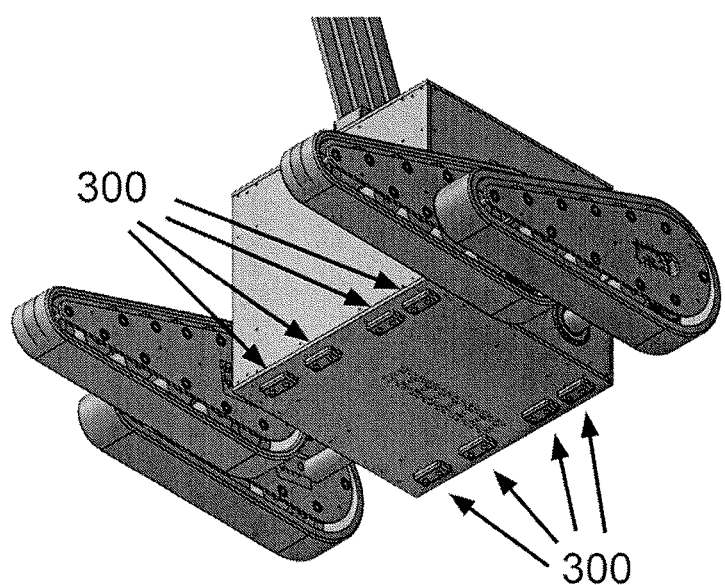
FIG. 10 shows various positions of depth sensors for detecting negative obstacles and stairs.

The main detection for negative obstacles are onboard forward looking navigation sensors, either camera or Light Detection and Ranging (LIDAR)/Infrared (IR). For backup and precision in detecting negative obstacles directly below the robot, IR sensors can be placed in the front, back and sides of the bottom of the lower body (FIG. 10). As the robot drives up to and over a negative obstacle, these sensors will detect exactly where the obstacle starts moving under the robot. This can be particularly useful when navigating up and down stairs, especially when climbing up and down angled stairs.

Motor Braking Force.

When any or all of the legs are pointed downward, thus lifting the robot upwards there will be a gravitational force encouraging the legs to lower the upper body. If the robot desires any of the legs to move in such a fashion as to lower the upper body, the gravitational force will push with the motors. In such instances, controlling the motors to move in such a way may provide too much force and move the leg too quickly. In such instances, the robot recognizes this issue and must issue commands in such a way as to minimize the potential excess force or use the controlling motors as brakes that regulate the gravitational force to move the legs into the proper position. In such instances, back electromagnetic force (EMF) may enter the motor circuit. The motor controller and power boards and any related electronics are designed to handle this back EMF and ensure that the EMF does not damage any circuitry.

Battery Placement.

Batteries are needed for constant untethered power for the robot. They can also be used as weight to balance the upper and lower body for greater maneuverability. The weight of the upper body may vary between configurations depending on the weight of the actuators, sensors, or other items attached to the body. Depending on the relative weight of the lower body and the upper body, the batteries can be placed in the lower or upper body. The battery may be, for example, lithium ion, nickel cadmium, lead-acid, or another rechargeable battery type.

Methods of Control.

There are several methods as user can use to control the robot. All commands from the user are sent to the robot via a remote interface (computer, tablet, and phone) over Wi-Fi, Bluetooth or similar connection. The user may or may not be collocated with the robot and could control the robot via a network (e.g., the internet). In remote control operation, the user can control individual actuators or motors on the robot and the robot operates in open loop mode, not monitoring internal or external sensor data, except for robot and environment safety. Pressing a forward or backward command will move a motor or series of motors forwards or backwards. For instance, all four treads can be controlled via a single button to move the robot forwards, backwards, left, or right or each tread can be controlled individually. In choreographed operation, a series specific motor commands or robot configurations are saved onto the robot and run in sequence once prompted. In this setup external sensors are only used for environmental safety. The robot uses internal vehicle state and the acts in a way similar to a dancer in a choreographed routine. In programmed operation the robot acts on internal and external sensor information to complete programmed tasks. In supervised operation, the robot completes automated tasks as commanded by the user. These are generally smaller tasks so that a user may monitor operations closely. In scheduled operation, the user schedules when tasks are to be completed and the robot completes them automatically, notifying the user of its activities and any issues.

Sensors for Robot Health and Control.

Sensors used in various robot activities (navigation, obstacle avoidance, etc.) may be placed on the robot either in the upper or lower body in a variety of positions as needed to support the activities. Additionally, the robot may comprise of a variety of sensors to monitor its health and know the current state (position, velocity, acceleration) of every actuator and the upper and lower body. The internal temperature of the entire robot is monitored by multiple temperature sensors. The motor and battery may further comprise a temperature sensor to detect local temperature changes. Microphones inside and outside of the robot listen for abnormal loud sounds. A sound inside the robot may signal a failing part. A sound outside the robot may signal a collision or near collision with an object or person or animal.

Figure 21:
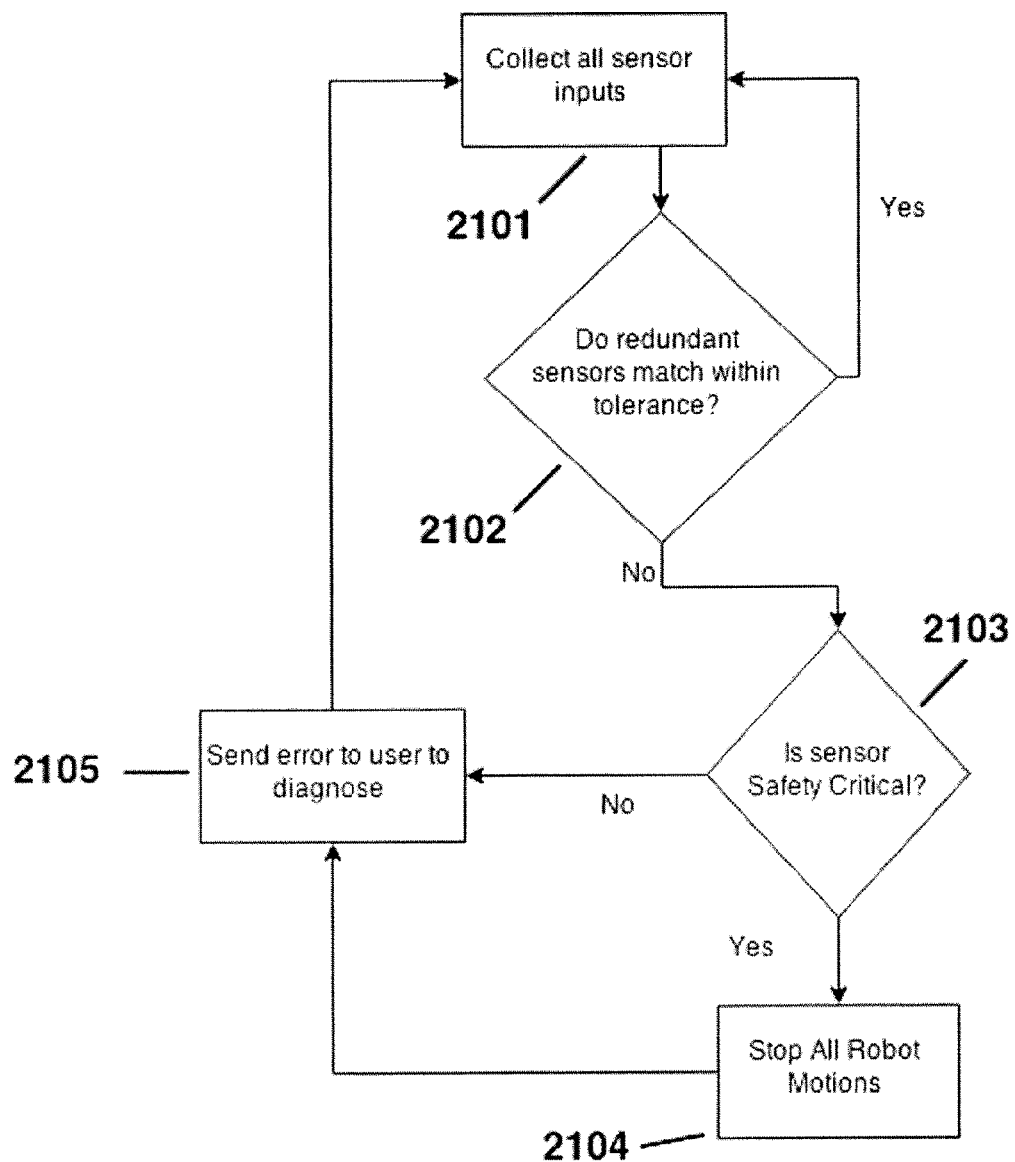
FIG. 21 shows a flow chart of the regular robot sensor checks.

Multiple sensors may be used to monitor the same vehicle health state. These sensors can be checked against each other to make sure they are each operating correctly as shown in the flow chart in FIG. 21. All sensor data is collected constantly (2101). Redundant sensors are sensors that each sense the same internal robot state, either directly or through an equation transformation. These redundant sensors are checked against each other (2102) and if the differences between them are within a set tolerance, the robot continues normal operation. Sensor anomalies are checked to see if the sensor or monitored vehicle state are safety critical (2103) and, if so, all robot motions are stopped (2104). In either case of sensor criticality, the error is sent to the user for diagnosis (2105).

Current and voltage sensors are used to monitor current in each motor, controller board power, and battery. When an anomaly is detected, data is sent to the main controller board for processing and action.

Each leg may contain multiple sensors to understand its orientation relative to the rest of the robot and its orientation relative to the world. All of these sensors are sent to at least one controller board for processing and monitoring. Data can be used for control, safety, and error checking Absolute position sensors attached at the connection between the leg and the lower chassis give the position of the leg, in degrees or radians, relative to the lower chassis and rotation speed, in degrees per second or radians per second. Accelerometers in each leg give information on the position of the leg relative to the world, showing how the leg is positioned relative to the earth's gravitational force. Limit sensors detect if the front legs have moved passed a certain angle and, if continued to move, will run into the back legs. Touch sensors may be located throughout the sides of the legs and behind the treads to detect any touches from outside objects.

Each arm may contain a variety of sensors to understand its orientation relative to the rest of the robot and its orientation relative to the world. Each joint may contain sensors to monitor the health of the joint motor, including voltage, temperature, angle, velocity, torque, plus other sensors to detect torque, angle, velocity, and acceleration relative to gravity. All this data can be used for control, safety and error checking and are sent to at least one controller board for processing and monitoring. Limit sensors in each joint detect if the joint has gone past its prescribed maximum angle.

The upper body may contain several sensors to monitor its position and activity during operations. An accelerometer will monitor the robot orientation relative to the earth. Limit sensors detect if the upper body has moved too far forward or backward from the lower body. All of this data is sent to at least one controller board for processing and monitoring.

Isolating Control Boards and Motors.

Due to the potential damaging effects of voltage and current fluctuation that is inherent with motor operations, the circuitry of the control boards and motors may be separated or regulated through the use of extra power circuits. If separated, communications between motors and power circuitry is achieved through optically isolated transistors or similar capability.

Multiple Processors.

The robot contains multiple processor boards to control and monitor the robot systems (FIG. 26). The main processor board (2601) takes data from sensors (2604) and other processor boards (2603, 2605, 2607) and sends commands back to other boards (2605, 2607) for command and control and to the user for input and information display (2602). The main processor board includes a multicore processor capable of running an advanced operating system (LINUX, etc.) with multithreaded operations and near real time image and data processing. In some instances a laptop may be used as the main processor board.

The low level processor boards are used to monitor and control specific motor movements and basic platform health. These boards may take a variety of inputs. Each arm, of which there may be several depending on the configuration, has its own Arm Processor Board (2605) that communicates between the Main Processor Board (2601) and the arm motors and sensors (2606). The Legs and Feet Processor Board (2607) communicates between the Main Processor Board (2601) and individual leg and foot motors and sensors (2608). In one configuration, a processor board is located with each motor and the boards are daisy chained together and connect directly to the Main Processor Board. Main Processor Board commands detail what specific motor movements need to be made for each actuator which may include position, velocity, maximum current and other relevant information. These commands detail either desired position or a velocity and direction of each actuator under command. Actuator position and velocity data show the absolute position and current velocity vector of each actuator. If velocity is not given, it can be inferred over time from multiple position inputs. Motors may send current state data including position, velocity, temperature, current, voltage and any warnings. Temperature, current, voltage, sound, humidity and other environmental sensor data are used to understand internal robot state or detect anomalies.

The User.

The user, or operator, of the robot gives the robot commands, answers questions from the robot concerning operations, and monitors the robot's operations for safety. The user may or may not be collocated in the same room or building as the robot. The user interacts with the robot via the User Interface (2602, FIG. 26).

Activities.

The robot has the physical ability to perform a variety of tasks. In a typical day the robot may have planned out several tasks to do during regular idle time. When prompted by the user, the robot can perform other tasks on demand. When needed or idle, the robot will go to a designate location, plug itself into the appropriate power outlet, and recharge its batteries. In addition to ascending and descending stairs and navigation, the robot performs two operations vital for a variety of tasks: opening and closing doors and mapping the home.

Open and Close Doors.

To properly navigate and operate safely the home, the robot will need to open and close doors. To open a door, the robot positions itself in front of the door, reaches out and grabs the doorknob or handle, turns the doorknob or handle, and either pushes or pulls the door open. To close the door, the robot completes the same maneuver but in reverse.

Mapping a Home.

During regular operation, the robot will navigate throughout the house, opening doors, and create a map of the house, noting rooms and items of interest such as refrigerators, car keys, etc. To map the house, the robot may use cameras, active acoustics and infrared and other sensors. The robot can save this location information and use it for future navigation and completion of other tasks. For instance, if the user wants the robot to bring something from the kitchen to a bedroom, the robot can use the map to know where it is and where it needs to go. In certain embodiments, the robot may be provided with one or pre-existing maps, and/or may employ sensors to establish/identify known points. For example, checkpoints may be marked with RFID tags indicated that the robot is in a particular area. Such checkpoints may be used to calibrate, or confirm, the location of the robot vis-à-vis the map.

Dusting.

For the dusting task, an algorithm identifies flat surfaces that are best suited for dust collection and dusting. The user confirms each area needing dusting and selects a time for dusting and period of time between dustings. Algorithms may recommend optimal times and periods for dusting. The user can also input other locations that need dusting. To dust, the robot grabs a duster and maneuvers the duster over the specific areas selected for dusting.

Pick Up Laundry.

The robot can map out rooms and determine where the floor of the room is and the correct configuration of all of the furniture. From this map, it can easily find items laid out on the floor or furniture. Through sensing, the robot can determine if an item is dirty laundry. Once located and if the robot is properly equipped, the robot can grab the laundry with one of its arms and move the dirty laundry to a laundry bin, washer, or another location designated by the user.

Cleaning Laundry.

The laundry task includes several subtasks that the robot must complete in order. First, the robot picks up dirty laundry, either from the room or from a bin as described above. Next, the robot brings the laundry to the washer, loads the washer, adds appropriate soaps if needed, and starts the washer. After the wash is completed, the robot moves the laundry to the dryer and starts the dryer. Once the laundry is done drying, the robot takes the laundry out of the dryer, folds it, and returns the clothes to the appropriate room. To complete these tasks, the robot is equipped with at least two arms.

Fetching.

When prompted by the user, the robot is able to retrieve a variety of items including drinks (beer, wine, soda, etc.), lost keys, or other small items. To fetch an item, the robot first knows where the item is located. For drinks, the robot already has a map of the house and knows where the appropriate refrigerator is. For keys or other small items, the robot regularly navigates the house to map these items. The robot goes to the selected location and retrieves the item. For items in refrigerators or other closed spaces, the robot opens and closes the door appropriately per description above. Then the robot brings the item to the user.

Hide and Seek.

Using the map the robot has of the house and knowing its basic physical shape, it can select an excellent hiding place to play hide and seek with humans. The robot can maneuver itself to see when a human has spotted it or, using a microphone, hear when a person says a certain set of words to know it has been found. The robot can select more or less difficult hiding places depending on the level set by the user.

By increasing the size of the actuators in the legs and arms, the robot is capable of stronger tasks and uses outside of the household. The robot can carry large cargo up and down stairs and between rooms. This is useful for moving furniture, groceries, boxes, and people. With a specialized gripper the robot can pick and place books in a library, stock food in a store, or scoop ice cream from ice cream tubs. Given appropriate program the robot is capable of a variety of other tasks in and out of the home. In the office the robot can move boxes, sort mail, and keep the office clean and organized. When controlled by a user remotely, the robot acts as a remote presence device that is used in many occupations including doctor visits, family visits, home security, emergency response, fire response, parole officer check in, home repairman, home appraiser, real estate monitoring and searching, and a home claims appraiser. When interacting with occupants of the home the robot is capable of many other tasks including companionship, brushing teeth, preparing meals, cleaning dishes, walking pets, tutor, video game buddy, taking out the trash, mowing the lawn, landscaping and pruning trees and plants, dance companion and instructor, yoga instructor, boxing partner and fitness trainer.

The above-cited patents, patent publications and articles are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. While the above description contains many specificities, these should not be construed as limitations on the scope of the disclosure but rather as an explanation of one preferred embodiment thereof. Many other variations are possible. Accordingly the scope of the disclosure should be determined not by the embodiment illustrated but by the appended claims and their legal equivalents. Thus, it is to be understood that the invention may therefore be practiced otherwise than as specifically described above.

What is claimed is:

1. A method of climbing a stair, the method comprising:
   driving an articulated vehicle along a drive-direction on each stair, the vehicle comprising:
   a rigid lower chassis having forward and rearward portions and right and left sides and a top and bottom;
   front left and front right legs, each leg having a proximal end and a distal end, the proximal end of each leg being pivotally coupled to the rigid lower chassis about the transverse axis generally perpendicular to the sides of the rigid lower chassis in a front half of the rigid lower chassis and the distal end being pivotable at least 180 degrees about the transverse axis without interference from other parts of the articulated vehicle;
   rear left and rear right legs, each leg having a proximal end and a distal end, the proximal end of each leg being pivotally coupled to the rigid lower chassis about the transverse axis generally perpendicular to the sides of the rigid lower chassis in a rear half of the rigid lower chassis and the distal end being pivotable 360 degrees about the transverse axis without interference from other parts of the articulated vehicle;
   at least four articulator motors disposed on the lower chassis and at least one coupled to each leg for pivoting each leg about the transverse axis;
   an upper chassis having forward and rearward portions and right and left sides and a top and bottom;
   a middle body neck portion with two ends with one end connected to the bottom of the upper chassis and one end connected to the top of the lower chassis;
   an articulator motor disposed on the lower or upper chassis and coupled to the middle body neck portion for pivoting the upper body forward or backward of the lower body;
   driving, while the rigid lower chassis remains rigid and parallel to the ground and the top of the rigid lower chassis remains parallel to the upper chassis, the articulated vehicle to approach a stair with the forward portion of the articulated vehicle;
   pivoting, while the rigid lower chassis remains rigid, the front legs about the transverse axis from a vertical position next to the lower chassis downward and forward until they touch the top of the step;
   pivoting, while the rigid lower chassis remains rigid, the back legs about the transverse axis from a vertical position next to the lower chassis downward and forward until they are parallel to the ground;
   pivoting, while the rigid lower chassis remains rigid and the top of the lower chassis remains parallel to the bottom of the upper chassis, the middle body neck portion forward from the rigid lower chassis, moving the upper chassis forward of the rigid lower chassis;
   pivoting, while the rigid lower chassis remains rigid, the front and back legs about the transverse axis downward and forward and the middle body neck portion backward until the rigid lower body is above the stair and the front legs are parallel to the stair;
   driving, while the rigid lower chassis remains rigid and parallel to the top of the stair, the articulated vehicle forward until the front legs are entirely on the stair;
   pivoting, while the rigid lower chassis remains rigid, the back legs about the transverse axis forward until they are in a vertical position;
   driving, while the rigid lower chassis remains rigid and parallel to the top of the stair, the articulated vehicle forward until the back legs are entirely on the stair; and
   pivoting, while the rigid lower body remains rigid, the front legs backwards and upwards until they are in the vertical position.

2. The method of claim 1, further comprising climbing multiple stairs by repeating the method of claim 1 over each stair.

3. The method of claim 1, further comprising driving the articulated vehicle forward or backward to maintain contact on the ground and stair so that the articulated vehicle remains statically and dynamically stable.

4. The method of claim 1, further comprising moving the upper chassis forward or backward so that the articulated vehicle remains statically and dynamically stable.

5. The method of claim 1, further comprising pivoting the front legs about the transverse axis forward and downward beyond parallel with the stair then backwards and upwards back to parallel with the stair so the rigid lower body remains parallel to the stair as the back legs rotate back to the vertical position.

* * * * *